(12) United States Patent
Osminer et al.

(10) Patent No.: US 8,370,818 B2
(45) Date of Patent: Feb. 5, 2013

(54) METHODS AND APPARATUS FOR ANALYZING SOFTWARE INTERFACE USAGE

(75) Inventors: Matt Osminer, Erie, CO (US); Robert F. Gazdzinski, San Diego, CA (US)

(73) Assignee: Time Warner Cable Inc., New York, NY (US)

( * ) Notice: Subject to any disclaimer, the term of this patent is extended or adjusted under 35 U.S.C. 154(b) by 1696 days.

(21) Appl. No.: 11/607,173

(22) Filed: Dec. 2, 2006

(65) Prior Publication Data

US 2008/0134156 A1 Jun. 5, 2008

(51) Int. Cl.
*G06F 9/45* (2006.01)
(52) U.S. Cl. ......... 717/140; 717/141; 717/143; 717/147
(58) Field of Classification Search .................. None
See application file for complete search history.

(56) References Cited

U.S. PATENT DOCUMENTS

| | | | |
|---|---|---|---|
| 5,895,472 A * | 4/1999 | Brodsky et al. ........................ 1/1 |
| 6,366,876 B1 | 4/2002 | Looney | |
| 6,381,735 B1 * | 4/2002 | Hunt ............................. 717/158 |
| 6,460,141 B1 | 10/2002 | Olden | |
| 6,606,711 B2 * | 8/2003 | Andrews et al. .................. 726/7 |
| 6,651,248 B1 * | 11/2003 | Alpern ......................... 717/162 |
| 6,948,175 B1 * | 9/2005 | Fong et al. .................... 719/331 |
| 7,010,796 B1 | 3/2006 | Storm et al. | |
| 7,039,633 B1 * | 5/2006 | Dey et al. .............................. 1/1 |
| 7,080,356 B2 | 7/2006 | Atallah et al. | |
| 7,137,106 B2 | 11/2006 | Herman | |
| 7,146,305 B2 | 12/2006 | van der Made | |
| 7,158,993 B1 * | 1/2007 | Schwabe ....................... 717/116 |
| 7,181,725 B1 | 2/2007 | Posegga | |
| 7,203,869 B2 | 4/2007 | Gwak | |
| 7,216,170 B2 | 5/2007 | Ludvig | |
| 7,266,726 B1 | 9/2007 | Ladd | |
| 7,290,253 B1 | 10/2007 | Agesen | |
| 7,401,324 B1 * | 7/2008 | Dmitriev ....................... 717/130 |
| 7,546,602 B2 * | 6/2009 | Hejlsberg et al. ............. 719/313 |
| 7,814,544 B1 * | 10/2010 | Wilhelm ......................... 726/22 |
| 7,945,902 B1 * | 5/2011 | Sahoo ........................... 717/131 |
| 2002/0198868 A1 | 12/2002 | Kinzhalin et al. | |
| 2003/0056217 A1 | 3/2003 | Brooks | |
| 2003/0217365 A1 | 11/2003 | Caputo | |
| 2004/0199903 A1 * | 10/2004 | Iizuka ........................... 717/128 |
| 2005/0071818 A1 * | 3/2005 | Reissman et al. ............. 717/127 |
| 2005/0114900 A1 | 5/2005 | Ladd | |

(Continued)

OTHER PUBLICATIONS

Xie et al., "MAPO: Mining API Usages from Open Source Repositories," ACM, May 2006.*

(Continued)

*Primary Examiner* — Insun Kang
(74) *Attorney, Agent, or Firm* — Gazdzinski & Associates, PC

(57) ABSTRACT

Methods and apparatus for analyzing the interface usage and requirements within software applications. In one embodiment, the interfaces comprise application programming interfaces (APIs) used with Java-based software, and the apparatus comprises a computer program that analyzes file paths (or classpaths) containing one or more files comprising Java bytecode. The names of the classes are extracted and placed into a class dictionary. The different classes listed in the dictionaries are broken down into their individual methods. Each method is then dissembled and analyzed for method or field invocations on other classes found in the dictionary. Methods called are added to a "used class" report. The used class report preferably contains the name of the class, method and the instruction information.

28 Claims, 13 Drawing Sheets

U.S. PATENT DOCUMENTS

| | | | |
|---|---|---|---|
| 2005/0132346 A1* | 6/2005 | Tsantilis | 717/168 |
| 2006/0020950 A1 | 1/2006 | Ladd | |
| 2006/0036750 A1 | 2/2006 | Ladd | |
| 2006/0047957 A1 | 3/2006 | Helms | |
| 2006/0130113 A1 | 6/2006 | Carlucci | |
| 2007/0217436 A1 | 9/2007 | Markley | |
| 2007/0261090 A1* | 11/2007 | Miller et al. | 725/100 |
| 2007/0288897 A1* | 12/2007 | Branda et al. | 717/124 |
| 2007/0294673 A1* | 12/2007 | Guerrera et al. | 717/130 |
| 2008/0098212 A1 | 4/2008 | Helms | |
| 2008/0178153 A1* | 7/2008 | Fox et al. | 717/122 |
| 2009/0222867 A1* | 9/2009 | Munetsugu | 725/100 |

OTHER PUBLICATIONS

Ellis, "Getting to Know the OpenCable Application Platform," Sun microsystems, Jun. 2006.*

Mayer, "Analyzing the Use of Interfaces in Large OO Projects," ACM, Oct. 2003.*

* cited by examiner

METHODS AND APPARATUS FOR ANALYZING SOFTWARE INTERFACE USAGE

RELATED APPLICATIONS

This application is related to co-owned and co-pending U.S. application Ser. No. 10/722,206 filed Nov. 24, 2003 and entitled "Methods And Apparatus For Event Logging In An Information Network", and also to co-owned and co-pending U.S. application Ser. No. 10/782,680 filed Feb. 18, 2004 and entitled "Media Extension Apparatus And Methods For Use In An Information Network", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computer software. More particularly, the present invention in one embodiment is related to analyzing the usage of application programming interfaces (APIs) associated with software used in network devices such as, e.g., consumer premises devices or receivers associated with content-based networks.

2. Description of Related Technology

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial. DTV standards such as the OpenCable Application Platform (OCAP) middleware specification (e.g., Version 1.0, 2.0, and 3.0) require that applications be downloaded to CPE from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

Software Interfaces

The well-known application programming interface (API) is an abstract concept describing a set of functions or methods called by software, including the particular format and organization of those function calls. An API describes how applications and software developers access a set of functions (for example, within a library) without requiring access to the underlying source code of the functions or library. The computer software that provides the functionality described by the API is said to be an implementation of the API. A reference implementation of an API is the implementation created by the designer of the API against which other implementations of the API are compared.

For example, an API might describe how an application may call an image-drawing function within a graphics library, for displaying rendered graphics images on a computer display. A programmer can accordingly write a program which calls the image-drawing function described in the API. When executed, the program will use the implementation of the API (a library) to draw the image.

Application programming interfaces (API's) are often standardized in order to allow programmers to write applications and libraries that work together.

Java and Object-Oriented Programming

Java (e.g. Sun Microsystems' JAVA®) is a general purpose object-oriented programming language which can be used in a distributed environment such as for example a content-based network or the Internet. Java has become a common software language used to develop applications for cable set-top boxes and OCAP-compliant applications. The Java virtual machine (JVM) executes Java bytecode which is generated by compiling text files containing Java language syntax.

In object oriented programming languages such as Java, objects refer to what is run in the computer; i.e., they comprise modular units of code that make up the inner workings of a process. Each object is classified in a generic class or "type" of object. Other generic classes are defined so that objects can share models and reuse the class definitions in their code. Each object is also an "instance" of a particular class or subclass, having the class's own methods, procedures and variables. Each object contains the variables of the class of which it is an instance. The object's methods are configured to accommodate actual values that are supplied to the object when that object is being used. A Java object can take advantage of being part of a class of objects, and inherit code that is common to the class. It contains limited and well-controlled references to data external to the object (or other known objects).

The term "method" in the Java context refers to a programmed procedure that is defined as part of a class, and is included in objects of that class. A method can be thought of as one of the object's capabilities or behaviors. Classes and objects can have more than one method associated therewith. A method associated with an object can access data known to that object; this approach helps ensure data integrity among the set of objects in an application. Methods can be re-used within multiple different objects if desired.

Similarly, a Java "class" can be considered a template definition of the methods and variables in a particular type of object. Hence, an object is a specific instance of a class, and it contains real values instead of variables. Classes can have sub-classes that can inherit all or some of the characteristics of the class. Sub-classes can also define their own methods and variables that are not part of the class from which they inherit.

Java source code files are compiled into a format known as bytecode. Such bytecode files (having a ".class" extension) can be run on any device also having a Java virtual machine (JVM); hence, Java bytecode is independent of the platform on which it is run. The JVM is used to interpret the bytecode into code that will run on real computer hardware. The JVM's instruction set is stack-oriented, utilizes a variable instruction length, and supports object-oriented programming by including instructions for invocation of object methods similar to subroutine call in other instruction sets. The JVM may also include a just-in-time (JIT) compiler which directly converts the bytecode into "native executable code" (e.g., native executable hardware instructions) as an alternative to interpreting one bytecode instruction at a time.

So-called "enums" or enumerations are an optional mechanism to provide a user-defined type along with an enumeration of all of the possible values for a variable of this type. For example, the type Day might include enumerated values of Monday, Tuesday, Wednesday, and so forth. Important characteristics of such enums include (i) type safety; (ii) compact, efficient declaration of enumerated values; (iii) runtime efficiency; and (iv) integration with other language features.

OCAP-Related Requirements

As previously noted, Java has become the common software language used to develop applications for cable set-top boxes and OCAP-compliant applications. The Open Cable Application Platform (OCAP) middleware comprises standardized APIs put forth by the cable television industry to facilitate the creation of cable focused software applications from a variety of sources. OCAP-compliant applications can interoperate with one another and can run on OCAP complaint set-top boxes.

Programmers developing applications for cable set-top boxes must test their code to confirm that it is OCAP-compliant. Additionally, cable set top boxes operators and manufactures need effective methods for testing applications for OCAP-compliance prior to or concurrent with deployment. In many instances, the applications deployed by the MSO and received by the set-top box will be in the form of object code including compiled Java code.

Thus, in order to facilitate development and testing of OCAP-compliant applications, effective methods and apparatus for analyzing the application programming interface usage of a software application would be highly desirable. Additionally, it would be useful to have an application that provides feedback regarding the particular application interface used by a program to facilitate modification of a particular piece of code. This will allow developers, vendors and users of the code to evaluate and exchange information about the condition of that code more rapidly and more effectively, thereby reducing development time. And because the code will typically be exchanged in object form, it would be useful if the API of code could be determined using code that is in object form.

Prior Art API-Related Software and Solutions

A variety of different approaches to API creation, usage and management in computerized systems are evidenced in the prior art. For example, U.S. Pat. No. 6,366,876 to Looney issued Apr. 2, 2002 entitled "Method and apparatus for assessing compatibility between platforms and applications" discloses embodiments that can be used to assess whether a software application is compatible with an operating platform. A specification that describes the operating platform is generated using a definitional language. The specification identifies the programming resources of an operating platform. The application's dependencies and programming resources are identified. A compatibility engine is executed to resolve an application's dependencies to the specification. The output of the compatibility engine identifies whether the application conforms to the operating platform and how it deviates from the specification.

U.S. Pat. No. 6,460,141 to Olden issued Oct. 1, 2002 entitled "Security and access management system for web-enabled and non-web-enabled applications and content on a computer network" discloses a security and access management system that provides unified access management to address the specific problems facing the deployment of security for the Web and non-Web environment. An API server is disclosed that records all connections and disconnections of API clients in a log file. The API logon log file can be used for auditing API usage. The API server also records a summary of all transactions in a log file. The API transactions log file can also be used for auditing API usage.

U.S. Pat. No. 7,010,796 to Strom, et al. issued Mar. 7, 2006 entitled "Methods and apparatus providing remote operation of an application programming interface" discloses a system that can analyze an application programming interface definition to automatically produce software string generator and parser software components allowing remote access to functions within the application programming interface definition by processes that are not natively compatible with the computing system environment in which the application programming interface operates. A first string generator processes can produce an encapsulated function call from a first process, such as a Java-based process, that calls a first function in a first computing environment. A second parser process operates in a second computing environment to receive the encapsulated function call and to invoke a second function call in a second process, such as a C-based process. Results from the second function call are returned to a second string generator which produces an encapsulated response that is returned to a first parser process. The first parser process maps the encapsulated response back into first function call parameters for return to the first process, thus providing access to second functions of the application programming interface by the first process.

U.S. Pat. No. 7,080,356 to Atallah, et al. issued Jul. 18, 2006 entitled "Certification test suite" discloses a system and method for assessing binary compatibility between software modules permits software developers to register with a system, download software tools for testing binary compatibility between their software products and one or more ABIs. The system further enables software developers to certify their binary compatibility with one or more ABIs by uploading compatibility information to the system. A unique identifier of the software, e.g., the MD5 signature of the binary code, may be uploaded with the results of the compatibility test. The results of the compatibility test and the unique identifier may be stored in a database to record whether the developer's software is binary compatible with one or more of the ABIs. In addition, computer users may register with the system, utilize a tool that collects the MD5 signatures of the binary files on their computer(s) and forward the MD5 signatures to the system. The system may receive the MD5 signatures, compare them to the MD5 signatures on record, and generate a report indicating the binary compatibility of the files resident on the user's computer system.

United States Patent Application Publication No. 20020198868 to Kinzhalin, et al. published Dec. 26, 2002 and entitled "System and method for specification tracking in a Java compatibility testing environment" discloses collecting information on a specification of a computer program. A plurality of classes is provided, where each class is capable of performing a particular task related to obtaining information from a specification. Then a command is received from a user. The command requests a particular task to be performed. A class is then selected from the plurality of classes based on the task requested by the received command, and the selected class is run. In this manner, information on the specification is obtained. The plurality of classes can include a get assertion class that obtains assertions from the specification, and a reporting class that provides information on test coverage of the specification.

A number of API-related software packages are also commercially available at present. These generally comprise programmatic analysis software in support of generating documentation, and are typically rendered in the form of a command-line user interface (UI). Two examples of such API documentation software are JavaDoc and Doxygen. Both the tools perform code analysis focused primarily on the automated documentation of APIs. However, both tools rely heavily on the source code (e.g., in-line source code comments), and mechanisms to properly generate documentation.

One example of a prior art API verification tool useful specifically within the OCAP environment is the XAV tool, which is an application evaluator that ensures interoperability with the OCAP standard. XAV applies objective repeatable tests to the set of resource files that compose an application. XAV generates and application summary report showing the total of tested resources, failures, and untested resources.

However, while XAV is effective for simple OCAP verification, it notably does not support API usage analysis or coverage. In the present context, the term "coverage" refers without limitation to whether or not an application simply makes a call on an interface (e.g., API), whereas the term "usage" refers without limitation to evaluation or determination of whether an application is using the interface correctly or not. Such information would be highly useful to provide real-world feedback to developers regarding issues such as the number of functions calls, as well as classes and methods that must be supported.

Thus there is a need for a software tool and associated methods useful for analyzing code for aspects including inter alia API usage and coverage, and providing detailed reporting back to the developer or operator. Such software tool and methods would also be adaptable in particular to the OCAP software environment, thereby affording content-based network operators, application developers, and DSTB or other CPE manufacturers and vendors an effective and convenient means for validating and analyzing prospective software applications for use in such content-based networks.

SUMMARY OF THE INVENTION

The present invention addresses the foregoing needs by disclosing apparatus and methods for software interface.

In a first aspect of the invention, a method of analyzing class-based computer code is disclosed. In one embodiment, the method comprises: receiving a first input containing first code; receiving a second input containing second code; extracting a first set of classes from the first input; extracting a second set of classes from the second input; analyzing each class in the first set of classes to generate a dictionary; analyzing each class in the second set of classes to generate a set of methods; and analyzing each method from the set of methods to identify invocations of classes present in the dictionary. In one variant, the method further comprises adding the invoked classes to a report, the report listing all application classes within the first set of classes, all application classes in the second set of classes, and all classes and methods in the second set of classes that identify one or more of the first set of classes. The report in one embodiment is rendered at least in part using a markup language (e.g., XML).

In a second aspect of the invention, a method of programmatically analyzing Java byte code in order to identify one or more called application programming interfaces (APIs) is disclosed. In one embodiment, the method comprises: providing a first file path containing first Java byte code; providing a second file path containing second Java byte code; parsing files found on the first file path to create at least one first parsed class file; placing a name of at least one class defined in the first parsed class file into a dictionary; parsing files found on the second file path to create at least one parsed second class file; evaluating each class on the second file path to identify one or more methods associated therewith; and evaluating each of the one or more methods to identify at least one method or field invocation associated with any classes in the dictionary.

In one variant, at least one of the first or second Java byte code comprises an application adapted to run on an Open Cable (OCAP) compliant consumer premises device (CPE) used in a cable network.

In a third aspect of the invention, a computer-readable storage device comprising a medium adapted to store a computer program is disclosed. In one embodiment, the program is adapted to analyze class-based computer code using the method comprising: extracting a first set of classes from a first input, the first input comprising first code; extracting a second set of classes from a second input, the second input comprising second code; analyzing each class in the first set of classes to generate a listing; analyzing each class in the second set of classes to generate a set of methods; and analyzing each method from the set of methods to identify invocations of classes present in the listing.

In a fourth aspect of the invention, a method of evaluating the compliance of a first computer program to a target standard is disclosed. In one embodiment, the target standard specifies use of a plurality of application programming interfaces (APIs), and the method comprises: processing, using a second computer program, a third computer program in order to determine the API usage of the third program, the third program being known to comply with the standard; and evaluating at least a portion of the first computer program against the determined API usage to determine if the first computer program supports all of the APIs used by the third program.

In a fifth aspect of the invention, a method of analyzing first software for application programming interface (API) usage via second software is disclosed. In one embodiment, the first software is rendered in an object-oriented programming language, and comprise at least one file path and referencing a library, and the method comprises: generating using at least the second software a data structure comprising a listing of all APIs that can be called by the first software; recursively examining, using at least the second software, all classes on the file path to identify library calls made by the first software; and generating, using at least the second software, a call report including at least the identified library calls. In one variant, the act of recursively examining comprises disassembling all class methods that reference calls within the listing, and the act of generating a data structure comprising a listing comprises generating a listing of all public methods on all public classes.

In a sixth aspect, a method of evaluating application programming interface (API) usage within an application program based on a library is disclosed. In one embodiment, the method comprises: identifying first and second sets of files to be processed; generating a first dictionary of all public classes and interfaces in the library; and performing a comparison process on the first and second sets of files to generate a second dictionary, the second dictionary comprising a plurality of entries indicating APIs called by the application program.

In a seventh aspect of the invention, a method of computer program evaluation is disclosed. In one embodiment, the program has a plurality of classes and methods associated therewith, and the method of evaluation comprises: disassembling at least one of the associated methods into a plurality of instructions; analyzing at least a portion of the instructions to identify one or more operation codes (op codes); analyzing at least one of the one or more identified op codes to determine an owning class for a target method or field associated therewith; evaluating the owning class against a dictionary of classes; and if the owning class is in the dictionary, including the at least one associated method in an output data structure.

In an eighth aspect of the invention, a method of specifying the minimum application programming interface (API) support requirements for a first computer program is disclosed. In one embodiment, the method comprises: processing, using a second computer program, a third computer program in order to determine the API usage of the third program; and generating output indicative of the API usage, the output being useful for specifying the minimum API support requirements for the first program.

In a ninth aspect of the invention, a method of developing a first computer program for use on a target platform is disclosed. In one embodiment, the method comprises: specifying application programming interface (API) support requirements for the computer program, the specifying comprising: processing, using a second computer program, a third computer program in order to determine the API usage of the third program; and generating output indicative of the API usage within the third program; and developing the first program based at least in part on the output, the first program at least meeting the support requirements.

In a tenth aspect of the invention, a method of processing object-oriented computer software is disclosed. In one embodiment, the method comprises: providing a plurality of class paths; generating code to implement one or more calls that are present in a first of the plurality of class paths, but not in a second of the plurality of class paths, the generated code being adapted to duplicate at least one interface associated with the one or more calls. In one variant, the method further comprises matching the at least one duplicated interface with a class or method that has the same or similar interface.

In an eleventh aspect of the invention, a software architecture adapted to determine the application programming interface (API) requirements for applications used in a content based network is disclosed. In one embodiment, the architecture comprises: a first software component disposed on a first computer; a second software component disposed on a second computer and in data communication with the first computer; and wherein the second component is adapted to receive a computer program to be evaluated from the first component, and evaluate the computer program to determine at least API usage therein, and provide a report comprising the usage to the first component.

In a twelfth aspect of the invention, a method of doing business is disclosed. In one embodiment, the method comprises: receiving a request for software interface support specifications associated with a network; generating a report comprising the interface support specifications; and providing the report to an entity issuing the request, the report being useful in developing at least one new application adapted to operate within the network.

In a thirteenth aspect of the invention, a database for analyzed applications or other computer programs used in a content-based network is disclosed.

In a fourteenth aspect of the invention, a method of software processing is disclosed. In one embodiment, the method comprises: providing a computer program application adapted for use on one or more network devices; determining those network devices on which the application is to be used; analyzing the application to identify API usage associated therewith; and providing the application to selective ones of the determined network devices. In one variant, the act of providing to selected ones is based at least in part on results obtained from the act of analyzing.

In a fifteenth aspect of the invention, a method of identifying and correcting incompatibilities or discrepancies within an application program is disclosed. In one embodiment, the method comprises: analyzing the application for application interface usage; identifying within the application one or more function calls against interfaces that are either prohibited or that do not exist; and providing at least placeholder code for the interfaces. In one variant, the application program is rendered in the Java programming language, and adapted for use in a network device in communication with a cable television network.

These and other aspects of the invention shall become apparent when considered in light of the disclosure provided below.

DETAILED DESCRIPTION OF THE INVENTION

Figure 1:
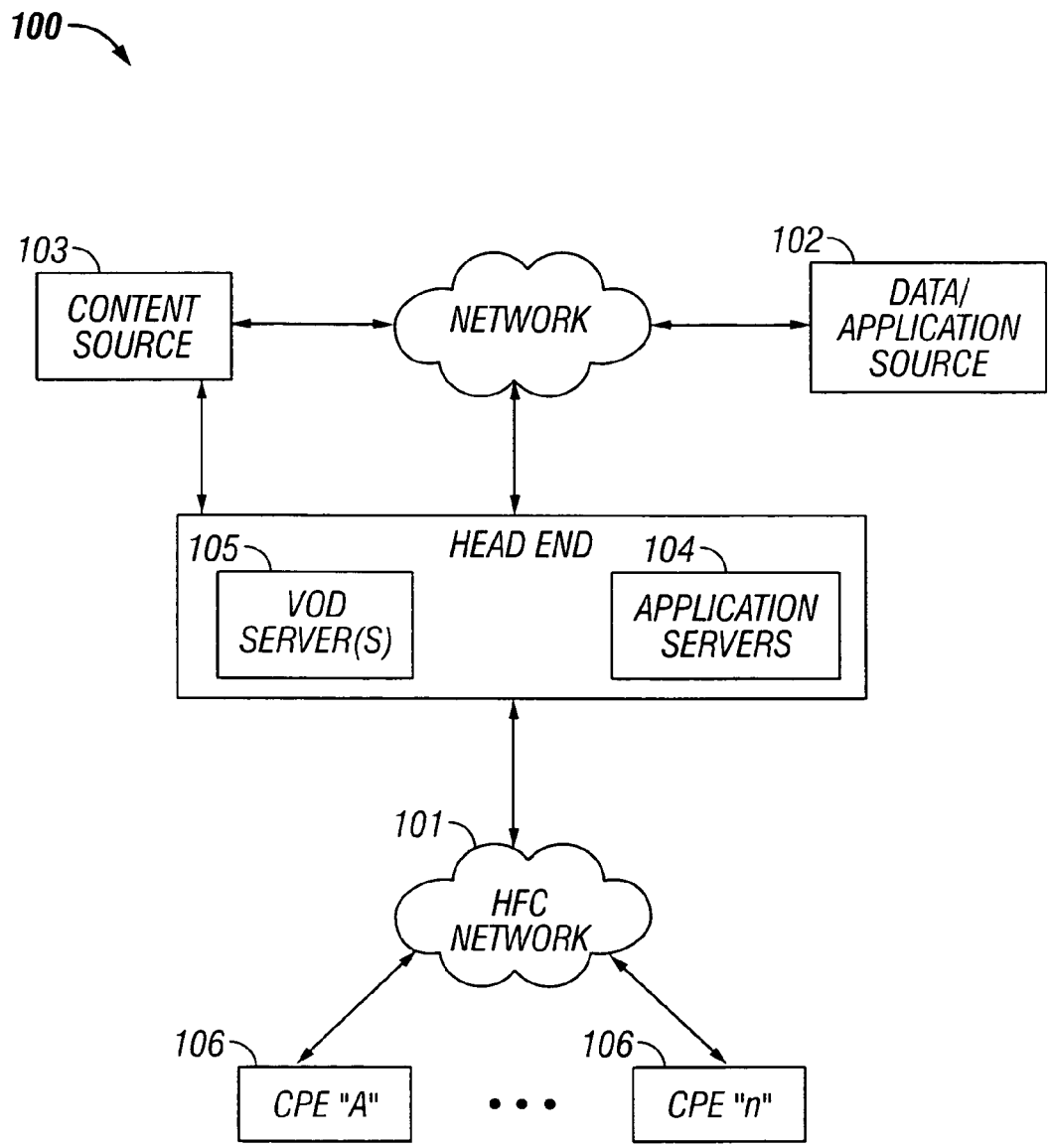
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBS), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

The term "component" refers generally to a unit or portion of executable software that is based on a related set of functionalities. For example, a component could be a single class in Java™ or C++. Similarly, the term "module" refers generally to a loosely coupled yet functionally related set of components.

As used herein, the term "conditional access" refers to any access control scheme, whether implemented in hardware, software, or firmware (or combinations thereof), including without limitation members of the "Powerkey" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "network interface" refers to any signal, data, or other interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a, b, g, n), WiMAX (802.16), PAN (802.15), or IrDA families.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses apparatus and methods for analyzing the usage of software interfaces (e.g., application programming interfaces, or APIs) associated with a software application or library. One embodiment of the invention includes an API reporting computer program which analyzes one or more inputs (e.g., file paths or classpaths). Each file path contains one or more files that are generated using Java (e.g. the Sun Microsystems' JAVA® programming language), although the apparatus and methods described herein may be more generally applied to other languages as well. It should be noted that the term "Java" as used herein may refer to programming languages in general and is used in an exemplary capacity and is not meant to limit the scope of the invention.

In one variant, the interface analysis and reporting program of the invention comprises a software algorithm adapted for programmatically disassembling and analyzing Java byte code in order to, inter alia, assess what APIs are called as part of that code. The exemplary method takes two inputs (input A and input B) for further analysis. The first input (input A) comprises a file path containing Java byte code; byte code on that path may be in the form of .class files or as a JAR (Java Archive) or ZIP archive of .class files. Input B comprises a second file path that may likewise contain .class files in literal, or JAR or ZIP archives of class files. Both file paths are synonymous to standard Java classpaths.

All class files found on classpath A are subsequently parsed. The names of the classes defined in the class file are extracted and placed into a dictionary. The public methods and fields available on these classes are also optionally extracted. Class files on classpath B are then similarly parsed. Each class on classpath B is broken down into its individual methods. Each method is then disassembled and analyzed for method or field invocations on any classes found in the dictionary built from classpath A. If a method call is found, the class being analyzed from classpath B is added to a report, optionally along with specific method and instruction information. Likewise, the classpath A class in the dictionary has the called method flagged or identified as a "called" API.

If debugging information is available in the original class files, location (e.g., source line numbering) information is also provided for reference.

Advantageously, the exemplary embodiments of the invention have absolutely no reliance on source code, and generate their report(s) strictly from compiled bytecode.

The foregoing exemplary embodiments of the computer program and software interface analysis approach are useful for, among other things, OCAP software stack development (e.g., to specify OCAP compliance requirements to OCAP stack vendors), OCAP-compliant application validation; and OCAP application requirements analysis. For example, the software provides explicit reports for OCAP stack vendors that indicate what APIs a given OCAP application requires. Output reports may also be used for assessing API coverage of automated or other test suites, pre-acceptance validation of third party OCAP applications, or automated application configuration.

Advantageously, the aforementioned API analysis and reporting software and methodology may be employed at any location throughout a network (e.g., at a cable network head-end or switching hub, or consumer premises device), or alternatively in a stand-alone configuration if desired. Accordingly, it can be used at literally any phase of application development and deployment; e.g., for initial development of new applications, after development but prior to deployment to network customers, or even post-deployment for evaluation purposes or the like.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

Moreover, description of the various aspects of the invention in terms of the Java programming language is merely exemplary; the invention is equally useful with other programming languages and environments.

It will also be appreciated that while described generally in the context of a consumer (i.e., home) end user domain, the present invention may be readily adapted to other types of environments (e.g., commercial/enterprise, government/military, etc.) as well. Myriad other applications are possible.
Exemplary Content-Based Network—

FIG. 1 illustrates a typical content-based network configuration with which the software interface analysis and reporting apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as an OCAP-compliant third-party application, MSO VOD-based or "Watch TV" application, etc.) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network entity. Exemplary embodiments of the CPE of the invention are described subsequently herein with respect to FIG. 5.

Figure 1A:
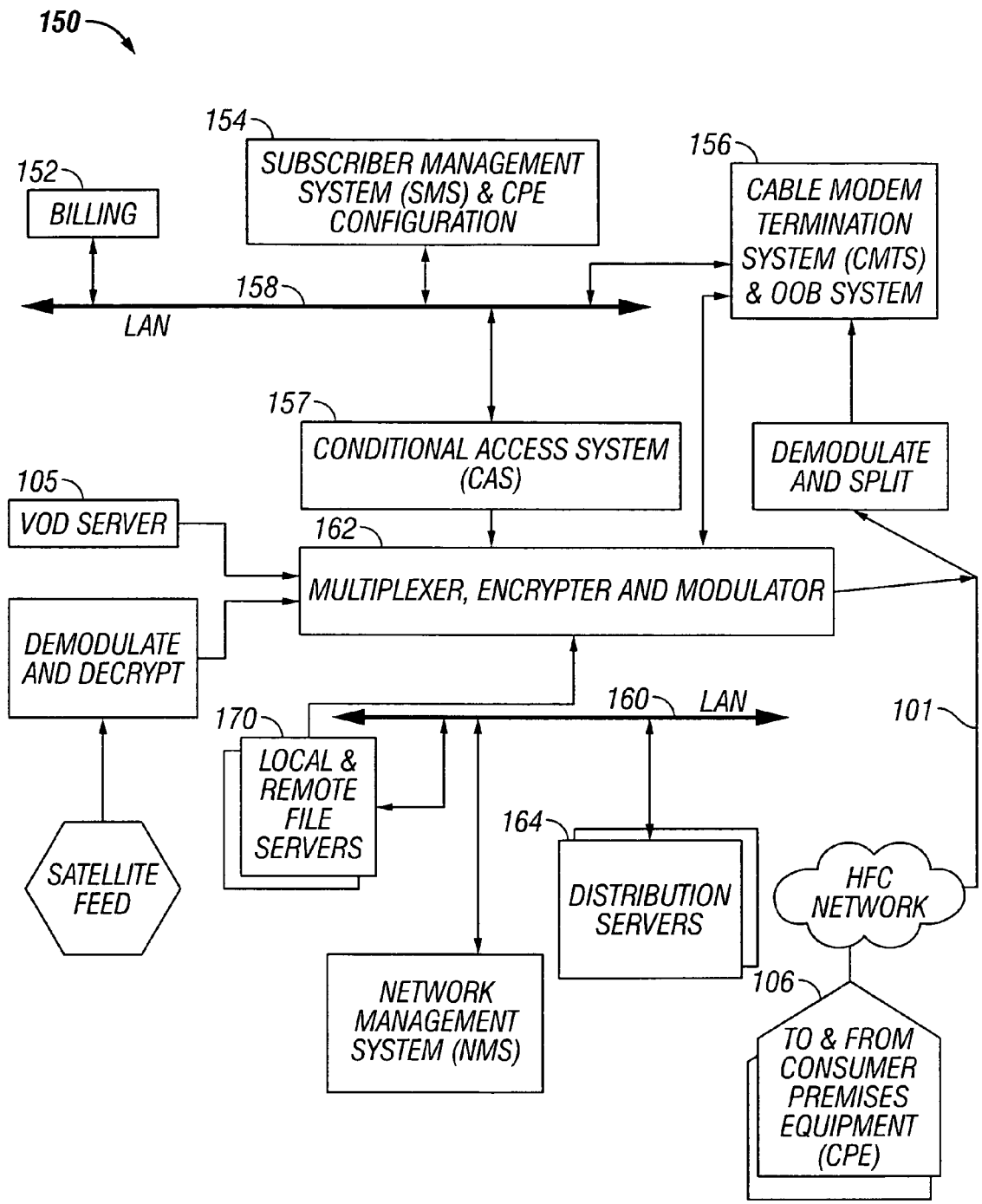
FIG. 1a is a functional block diagram illustrating one exemplary HFC cable network head-end configuration useful with the present invention.

Referring now to FIG. 1a, one exemplary embodiment of a generic network head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures (see, e.g., FIGS. 3e-3n and associated discussion presented subsequently herein).

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

Figure 1B:
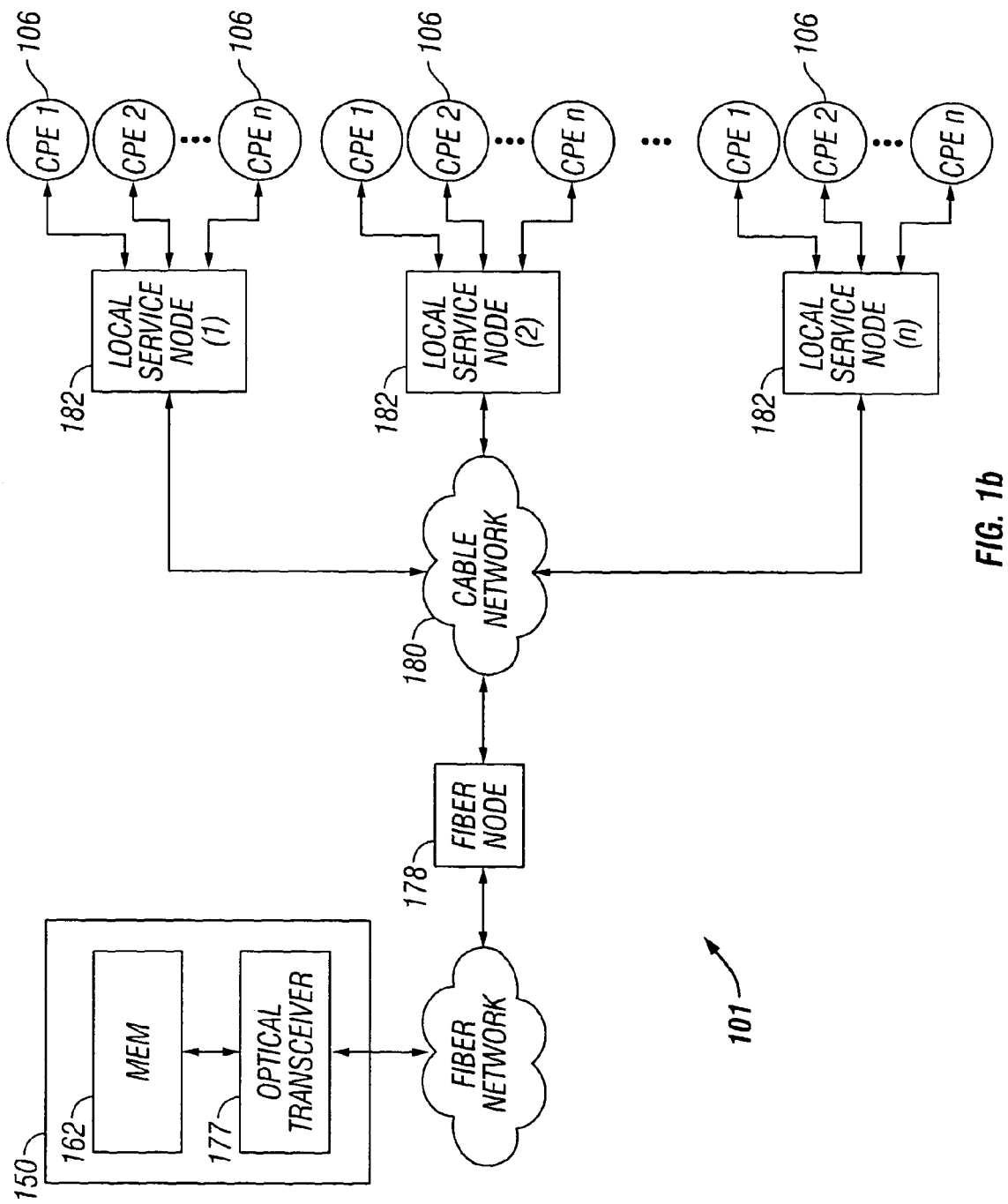
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
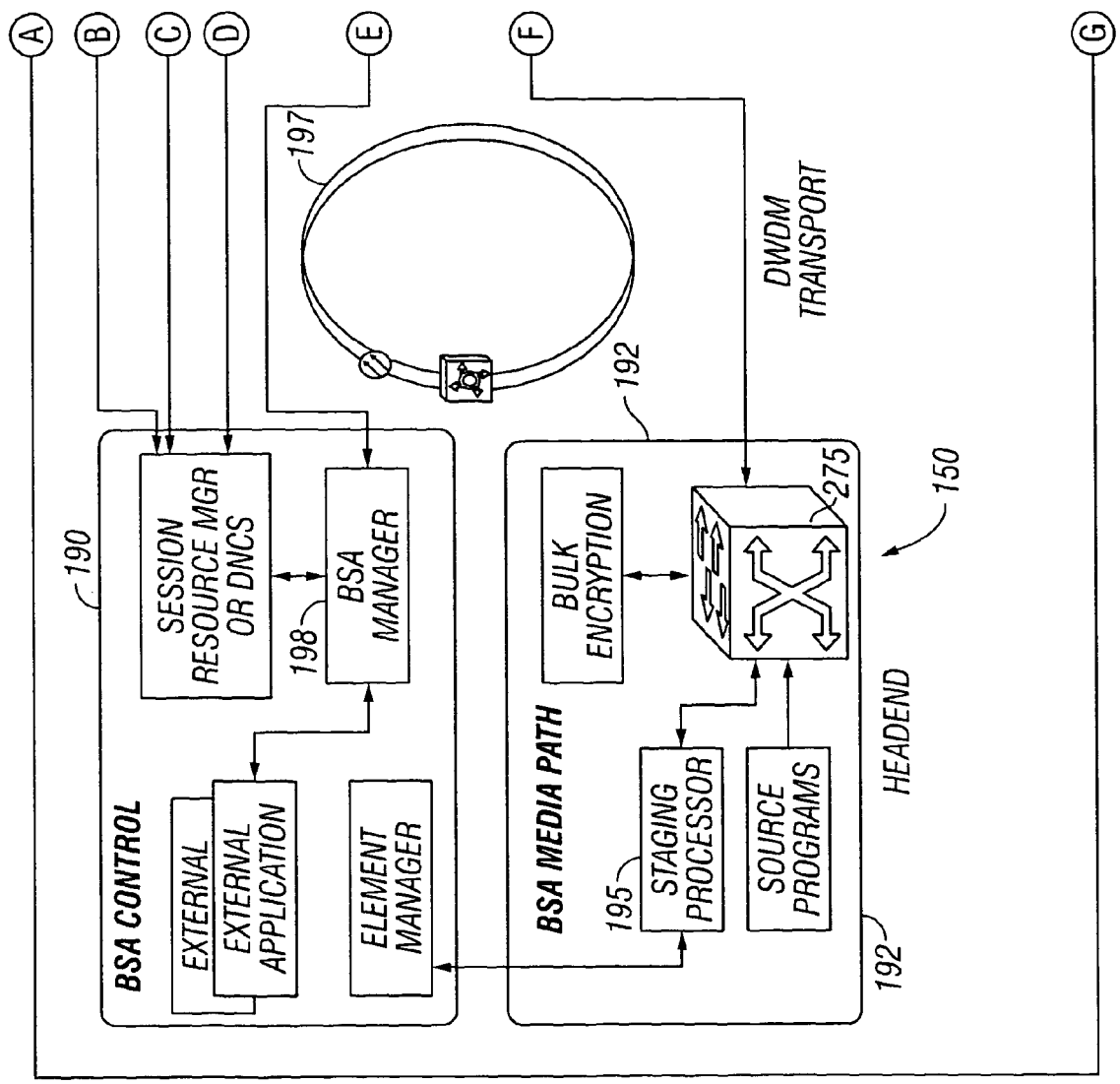
FIG. 1c is a functional block diagram illustrating one exemplary broadcast switched architecture (BSA) network useful with the present invention.
Figure 1C:
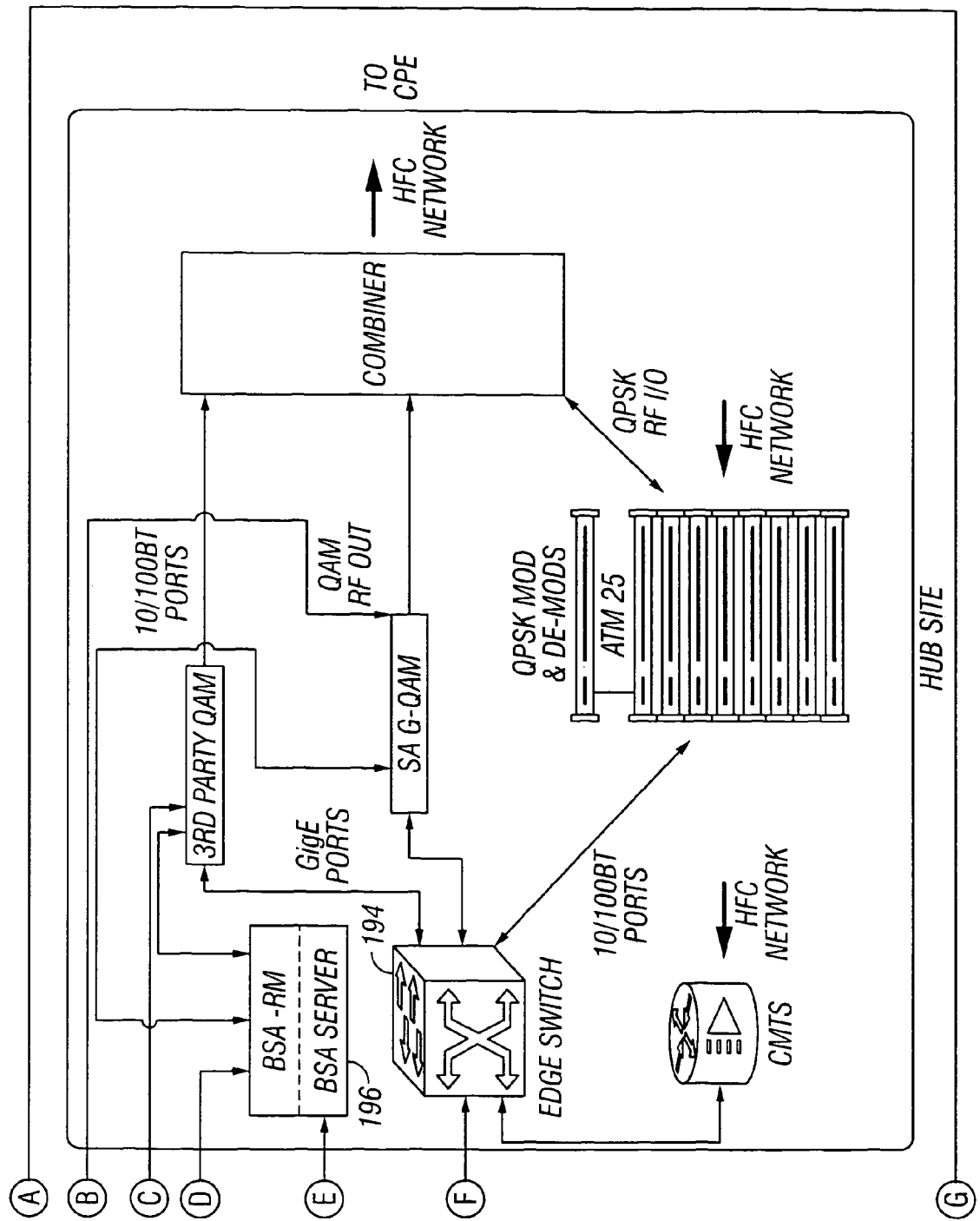

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Software Analysis Methods—

Figure 2:
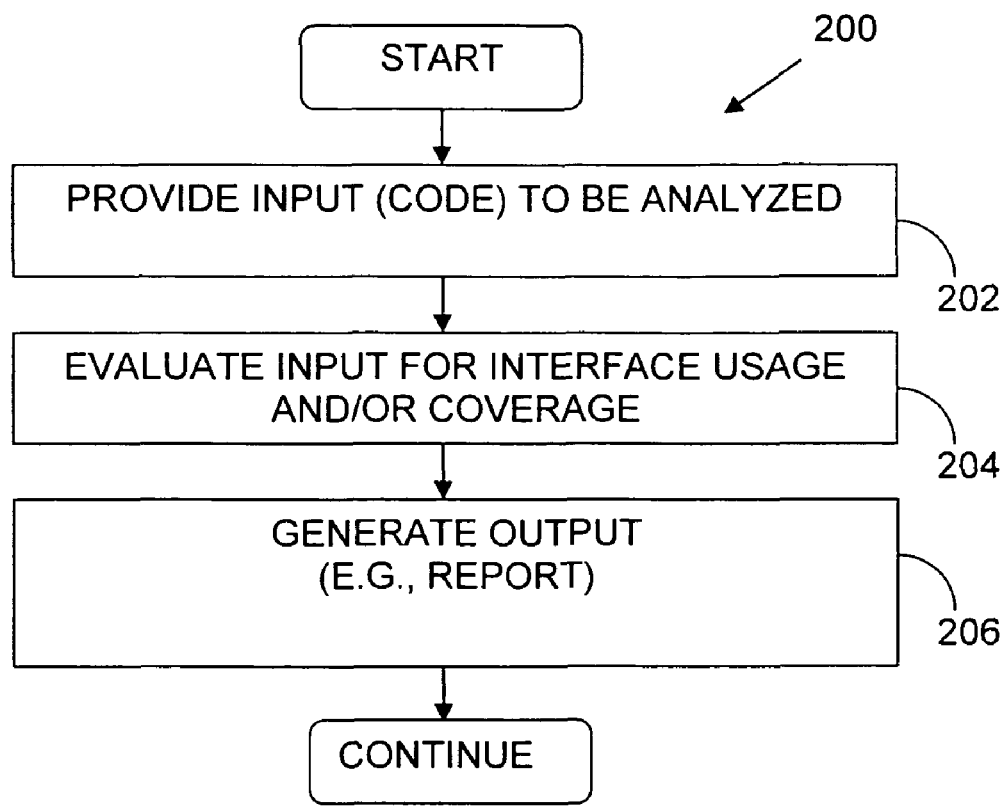
FIG. 2 is a logical flow chart illustrating one embodiment of the generalized methodology of software analysis according to the present invention.

Referring now to FIG. 2, a generalized software analysis and reporting methodology according to the present invention is described.

As shown in FIG. 2, the generalized methodology 200 comprises first providing source or input code for analysis (step 202). The code is then analyzed using software which evaluates at least one of software interface (e.g., API) "usage" and/or "coverage" (step 204). As previously noted, the term "coverage" in the present context refers without limitation to whether or not an application makes a call on an interface (e.g., API), whereas the term "usage" refers without limitation to evaluation or determination of whether an application is using the interface correctly or not. Hence, the analysis performed per step 204 may evaluate one or both of these aspects. For example, the analysis may simply identify calls on APIs. Alternatively, the analysis may also consider whether any usage of these called APIs has changed, or is not in compliance with prevailing use rules or restrictions on such use. These analyses can be conducted algorithmically (e.g., by one or more routines), or even manually if desired. A report or other useful output is then generated by the analyzing software for use by a developer, network operator, etc. (step 206).

It will be appreciated that the foregoing method 200 may be performed in an iterative fashion as well. For example, the output or report generated via step 206 may be provided to a developer, MSO, third party, or even as an input or reference for another software process, which then uses the information to make adjustments to a software application or test suite. The adjusted version of the software application can then be re-evaluated by the software analysis algorithm of the present invention, in order to re-assess API coverage and/or usage. The output of this second "pass" can then be used if required to form the input to a third iteration of the process, and so forth. In this fashion, a software application or other result having a desired API usage or coverage can be rapidly converged on.

Similarly, this iterative process can form the basis of a multi-variate analysis, such as where other parameters which may affect API usage or coverage are varied, and the effect on APIT usage or coverage evaluated subsequently.

Figure 2A:
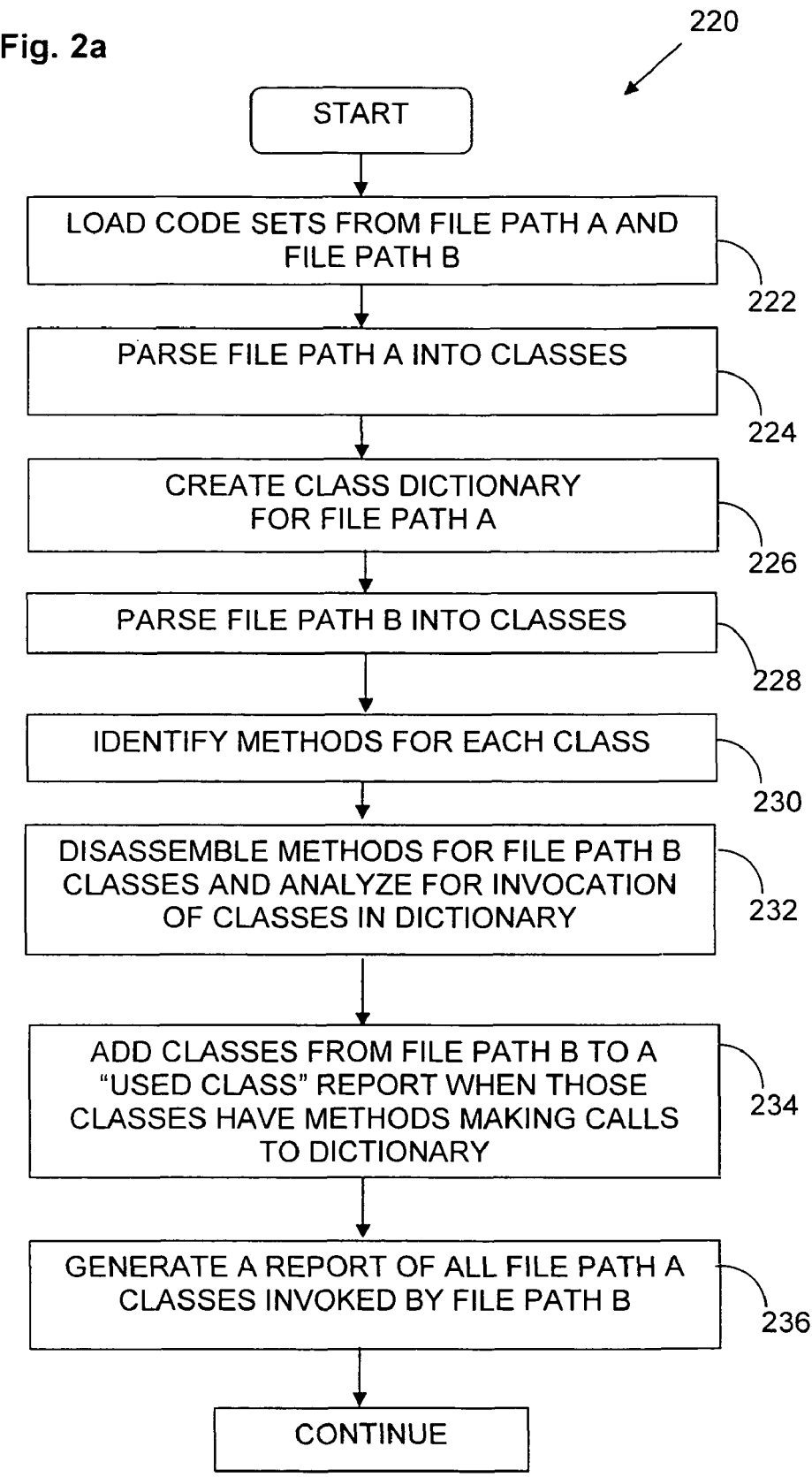
FIG. 2a is a logical flow chart illustrating one specific Java-based implementation of the method of FIG. 2.

FIG. 2a is a flow chart illustrating the steps associated with performing one specific embodiment of the generalized method of FIG. 2. Appendix I hereto provides exemplary code implementing this embodiment of the analysis and reporting methodology. The process 220 begins at step 222, wherein two sets of code obtained from first and second sources (e.g., file path A and file path B) are provided. At step 224, all .class files are located on file path A, and subsequently parsed. This can be accomplished using the exemplary Main class (see Appendix I), which is responsible for parsing command line options into a format usable by the analysis and comparison algorithm (Juxtapose) described below. The Main class does the following: (i) sets up a logger; (ii) get the program properties file; (iii) sets up the command line options and parses them; (iv) identifies all of the options and hands them off to the Juxtapose algorithm; and (v) parses out the library and application paths (e.g., the A and B file paths previously described). and hand off to the Juxtapose algorithm.

One or more class dictionaries for classes found in file path A are next created (step 226). In the present context, the term "library" refers without limitation to the set of class files defining an interface (e.g. API) suite. Since, the library data is rendered in a raw format, a dictionary is utilized. The exemplary embodiment of the library dictionary comprises a decompiled analysis of the library, which maps all public methods found across all classes in the library to their respective class. This information is used later in the exemplary analysis algorithm. In other words, the exemplary library dictionary comprises a structure that advantageously allows for easy and rapid cross-referencing of a method to the class to which that method belongs.

Class files on file path B are then similarly parsed (step 228). At step 230, the classes found on file path B are analyzed and categorized into their individual methods. At step 232, the methods for file path B are each disassembled and analyzed for any method or field invocations on classes found in the dictionary or dictionaries generated from file path A.

At step 234, classes from file path B that have such method calls or invocations are added to a "used class report". Additional information may also be optionally added, such as detailed method and instruction information, metadata, etc. For example, in one embodiment, the metadata feature of Java 5 can be used to provide additional functionality via the metadata. This feature allows, for example, enabling tools to generate "boilerplate" code from annotations in the source code. This so-called "declarative" programming style allows the programmer to identify tasks or functions, and the development tools produces the code to accomplish these functions or tasks. It moreover eliminates the need for maintaining current versions of "side files" by maintaining the relevant information within the source file. See, e.g., Java Specification Request JSR-000175, "A Metadata Facility for the Java™ Programming Language" (Final Release) dated Sep. 30, 2004, incorporated herein by reference in its entirety.

Also, if debugging information is available in the files, information relating to this aspect (e.g., the source line number) may also be provided for reference or other purposes.

The foregoing process may also be conducted iteratively; e.g., (i) analyzing a class from file path B, (ii) determining if any calls are made to classes in a dictionary, (iii) adding that class to the report if such a method call or invocation is found, (iv) proceeding to analyze the next class in file path B, and so forth.

At step 236, a report is generated indicating all classes in file path A that are invoked by file path B.

In one embodiment, a Library class is used to generate the report per step 244. This class encapsulates a class report for a library class, and includes a reference to a specific class file as well as a list of method indices that are called on this class. In one variant (described in Appendix I), this report generation process comprises: (i) setting the method information as being called; (ii) looking up the method information object on this class file, and adding it to a called methods list; (iii) verifying that the addition will not duplicate an existing entry; (iv) adding a method information object to the list of methods that are called on this class; (v) looking up the field information object on this class file and adding it to the called fields list; (vi) getting a list of all methods called on this class; (vii) returning an array of methods called on this (Library) class; (viii) retrieving all the fields called on this class; and (ix) returning the array of field sorted by name.

It will further be recognized that the foregoing methodology may be adapted to process three (3) or more inputs versus the two of the preceding example. For example, file path B may include one or more applications.

Additionally, file paths A and B can be "swapped". Swapping the two inputs may be used for example when looking for callbacks from an API back into the application. Callbacks are a common software element, and understanding where the API interacts with an application in callback situations advantageously may have great utility for the programmer. For example, there is potentially a large benefit when performing thread-safety and performance analysis.

Moreover, the exemplary analysis algorithm of the present invention may be adapted to perform a more thorough analysis to identify potential deadlock situations by virtue of a call into an API through a callback from the API. This approach is substantially dependent upon how the underlying threading model is set up with respect to the API, as will be appreciated by those of ordinary skill in the software programming arts. It will be recognized that this additional functionality may be integrated into the analysis algorithm previously described, or alternatively be part of a separate development (e.g., post-processing) tool. This capability can also be utilized in conjunction with the metadata functionality previously described, specifically by using metadata tags in code, thereby allowing a developer to capture the underlying thread model more concisely such that a post-processing tool or other mechanism can more accurately and automatically perform correct analysis.

Post-processing analysis may also be conducted in the context of API development or final application verification, such as to avoid having the software threading model encountering conflicts or "locking up". To this end, one or more tests may be applied to identify situations where a high propensity for such adverse conditions exists, and warn the developer (e.g., via a report or other output).

In accordance with still another embodiment of the invention, the method may comprise generating code to implement one or more calls that are present in one class path, but not the other class path. This generated code will duplicate the interface of the uncorrelated call, and attempt to match it with another class or method that has a similar interface. This attempt at self-healing facilitates making two code sets interoperable. Consider, for example, the scenario of an application or other software entity making a call to an interface (e.g., API) that is not present—perhaps due to version differences, a new application and old API, etc. This scenario has a high probability of occurring in certain circumstances including, notably, where "off the shelf" CPE (e.g., DSTBs, etc.) are allowed to operate on an OCAP content delivery network.

The exemplary analysis algorithm previously described is accordingly modified to add the capability to identify function calls against API classes that don't exist. Once such calls that are not defined have been identified, they are "stubbed". In the present context, "stubbing" comprises providing a placeholder (often limited to just declaring itself and the parameters it accepts) for a routine or function that is to be subsequently developed. The stub contains just enough code to permit compilation and linking with the rest of the program.

In the foregoing example, it is known that the call is missing, but evaluation of the bytecode does not provide useful information for identifying the function of the missing call performs. Hence, in one embodiment of the invention, this information is provided in the form of a report (or other output format), thereby facilitating analysis of the missing API. In one variant, a developer can use the report or output to determine what the most likely successful behavior of the call is, and provide source code for an API stub. Over time, the developer accumulates a more comprehensive list of stubs that can be, e.g., inserted into a database for easy reference and lookup.

The foregoing analysis algorithm (or an offshoot or post-processing development tool) is then modified to recognize the missing APIs, decompile the offending portions of the applications, insert the relevant stub(s), and recompile the file. This may be accomplished in a substantially automated fashion; e.g., under developer control using a GUI, etc., or even manually. It will also be appreciated that the bytecode can be "patched up" directly if so desired rather than performing decompilation and recompilation. In either case, the invention advantageously fixes the application such that it behaves according to a "good" set of APIs. It will be recognized that the foregoing approach may not work for all scenarios—some APIs perform user-visible functions that a stub can't perform, so the user experience will be affected, potentially rendering the application useless or inoperative in some circumstances.

Metadata of the type previously described may also be used to provide correct behaviors when a self-healing stub or insertion is made. For example, two or more choices may be presented to the developer, and the metadata can be used to determine the correct choice (e.g., True/False, etc.). By leveraging metadata tags a developer may specify in code what behavior is expected of the stub function, thereby allowing the self-healing algorithm to accurately select a stub function that will lead to successful execution of the application under consideration. This scenario is of particular interest when a developer knows a priori that a platform running an application may be API-deficient. For example, such a situation might occur in the presence of optional APIs provided by an API specification such as OCAP.

The aforementioned "self healing" approach of the invention finds particular utility for quick prototyping or simple version discrepancies, by inter alia speeding development. In one variant, a self-healing agent (e.g., module) running on an OCAP-compliant platform is used to account and correct for optional API discrepancies. For instance, not all OCAP stacks provide front-panel extensions, but MSO or other code may desire to make use of this. In a more general sense, certain MSO code is written to run on a prescribed OCAP stack that is written to a certain revision level of the OCAP specification; if another stack is used (e.g., supporting only a lower revision level), APIs could be missing, and some mechanism would be required to account for this difference. While Java bytecode aids portability in a literal sense, it is in a practical sense these API differences that can determine whether an application will run or not on a given device.

Despite the foregoing discussion of the exemplary embodiment in the context of an OCAP stack in an MSO-based network, it will be appreciated that the invention is in no way limited to such an application or context. For example, the self-healing apparatus and methodology described herein may be applied to consumer electronics models, such as on mobile devices (e.g., PDAs, personal media devices (PMDs), and even cellular telephones or smart-phones, such as e.g., those running J2ME or the like.

By providing an API analysis tool that reports the set of classes and methods called in the two inputs (e.g., sets of files), and which further indicates whether a method from the first file set has been called by the second file set, the described invention allows a programmer or developer to easily determine the set of functionality that must be supported by a set-top box or other CPE 106 that will be running the software. That is, the developer can determine whether certain software or libraries must be added to the CPE, or if certain software or libraries may be removed, thereby reducing memory storage and even potentially processing capability (e.g., MIPS) requirements. This allows the software developer to optimize their code for size and operation, and further allows the CPE designer to reduce processing and memory requirements. Stated simply, optimized applications that have little or no excess overhead or code (e.g., that would support otherwise unused libraries, methods or functions) can run more efficiently and on a "thinner" CPE. They are also often less prone to incompatibilities with other applications running on the same CPE 106.

Additionally, the aforementioned report may be used to confirm compliance with a standard (API) such as OCAP. This can be performed by using known complaint code as one of the files or classpaths as input (a known reference) to the API reporting program.

Stand-Alone or Network Analysis Device—

Figure 3:
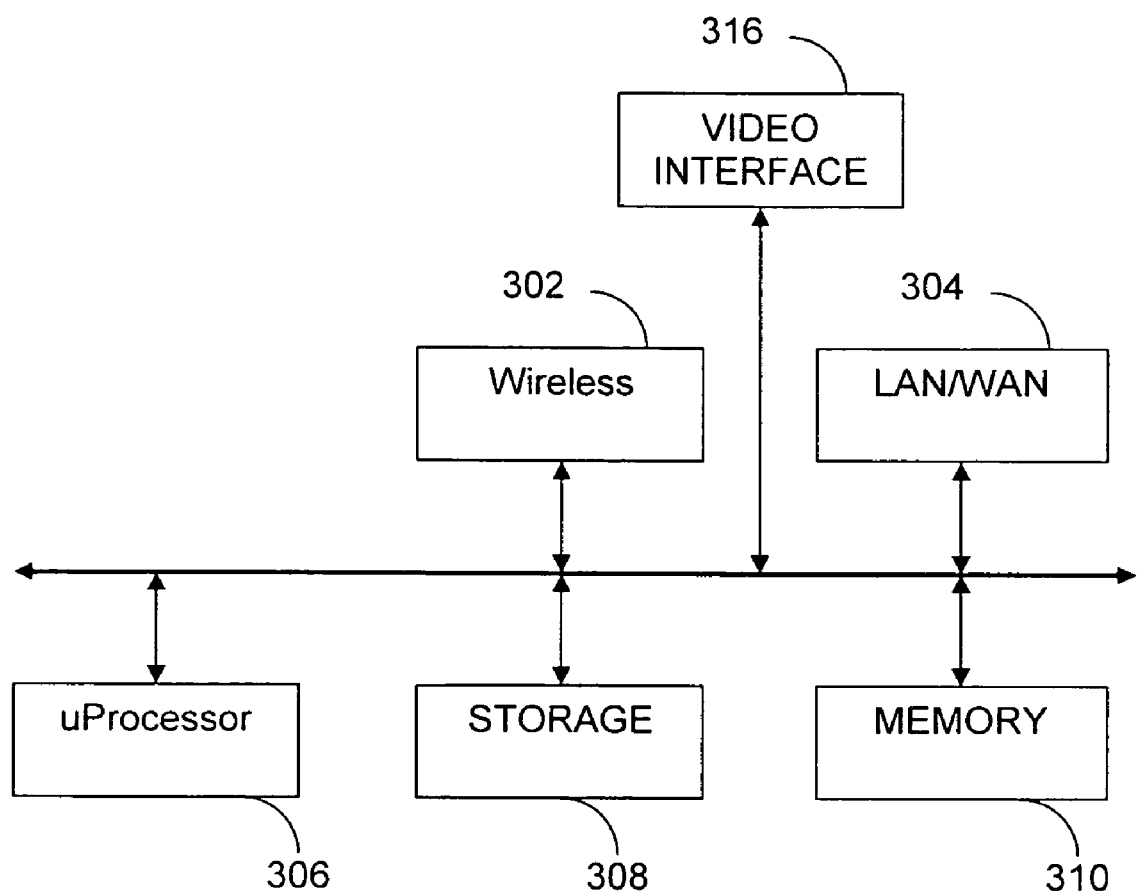
FIG. 3 is a functional block diagram of a computer system configured in accordance with one embodiment of the invention.

FIG. 3 is a block diagram of an exemplary computer system according to one embodiment of the invention. This computer system may comprise a stand-alone workstation, or networked with other computers (e.g., via a LAN, WLAN or internet), as well as being networked with other devices within a content-based network paradigm as described in greater detail subsequently herein.

The illustrated computer system includes microprocessor 306, storage unit 308 and memory unit 310. Additionally, the computer system might include a WiFi wireless interface 302, an Ethernet or other such LAN interface 304 and a video interface 316 for driving a video monitor. Other interfaces (not shown) may include a keyboard and mouse interface, the use of which is well known in the art.

During operation, software and other data stored in the storage unit 308 are read into the memory unit 310 and then run on microprocessor 306. This software may create new data and may also read additional data or files from the storage unit 308.

In accordance with one embodiment of the invention the software programs that run on microprocessor 306 include an API analysis and reporting program previously described (rendered in the form of object code that is stored on the storage unit or another connected storage device) that reads files containing other software programs or libraries. The API analysis and reporting program is used to, inter alia, analyze the application programming interface (API) usage and/or coverage of those other software programs or libraries, and generate a report in electronic form (e.g., as an XML, HTML, etc. data file written to the storage device 308 or transmitted over an interface to another computer), printed form (e.g., output via a USB or parallel printer port), displayed on the computer's display device, or any other combination of the foregoing. The report may also be of the form of an input to another computer program (e.g., automatic test suite, development environment, etc.) that is adapted to make use of the report and information contained therein.

In an exemplary operation, the API analysis and reporting program of the computer device 300 takes two inputs referred to as file path A and file path B. The file paths may also be referred to as "classpaths."

Each file path contains one or more files that are read into the API analysis and reporting program. The files in file path A contain Java bytecode. This file may be in the form of a .class file, or as a JAR (Java Archive) or a ZIP archive of .class files. Likewise, the files in file path B preferably contain Java bytecode in the form of .class files, or as a JAR or ZIP archive.

In accordance with one embodiment of the invention, the generated report includes two sections. The first section includes information describing what library calls are made from each code path. For example, the report might indicate the set of calls that are part of the OCAP standard API. The second section lists all the places in the code that made a call to a given API. In one embodiment, the aforementioned report comprises an XML-based output (e.g., including an XML schema to describe the XML), although literally any sort of reporting format is compatible with the present invention. It will be appreciated, however, that other report formats may be utilized with equal success, and in fact may be statically or dynamically selected based on the particular application of the API program. For example, the API analysis and reporting program in one embodiment comprises a module adapted to determine the type of code being analyzed as part of the input(s) A/B, and select an appropriate report format based on that determination. Hence, for an OCAP-compliant application, a report format particularly useful for evaluating OCAP compliance is used, thereby optimizing the utility of the process as a whole.

Moreover, the present invention further contemplates the use of different code modules or algorithms for the analysis portion (e.g., API usage or coverage, etc.). For example, it may be determined that one algorithm is optimized for analyzing certain types or structures of code (e.g., Java bytecode), whereas another algorithm is optimized for another structure (e.g., another type of "bytecode"); accordingly, the analysis program can be adapted to identify the different types of input in the two cases, and select the appropriate algorithm for API analysis.

Additionally, in accordance with another embodiment of the invention, the API analysis and reporting program generates specification files that list all the classes identified during the processing of the two file paths. The information in the exemplary specification includes: (i) the classes, (ii) associated methods, (iii) interfaces, (iv) enums, (v) exceptions, (vi) errors, and (vii) annotation fields.

In the exemplary embodiment, each class, interface, nested class and nested interface has its own separate page, or alternatively can be represented on a single (e.g., XML) page. Each of these pages has three sections consisting of a class/interface description, summary tables and detailed member descriptions. These descriptions include class inheritance diagram, direct subclasses, all known subinterfaces, all known implementing classes, class/interface declaration, class/interface description, nested class summary, field summary, constructor summary, method summary, field detail, constructor detail, method detail.

Each summary entry may contain a portion (e.g., the first sentence) from the detail description for that item, if Java documents or similar sources are provided. This information is typically compiled out of the program, but can be re-inserted if desired. The summary entries are alphabetically ordered, while the detailed descriptions are in the order they appear in the source code. This approach advantageously preserves the logical groupings established by the programmer.

Each annotation type preferably has its own separate page with the following sections: (i) annotation type declaration, (ii) annotation type description, (iii) required element summary, (iv) optional element summary, and (v) element detail.

Each enum preferably has its own separate page with the following sections: (i) enum declaration, (ii) enum description, (iii) enum constant summary, and (iv) enum constant detail.

Each documented package, class and interface preferably has its own use page. This page describes what packages, classes, methods, constructors and fields use any part of the given class or package. Given a class or interface A, its use page includes: (i) subclasses of A, (ii) fields declared as A, (iii) methods that return A, and (iv) methods and constructors with parameters of type A.

The exemplary embodiment also includes a class hierarchy page for all packages, plus a hierarchy for each package. Each hierarchy page contains a list of classes and a list of interfaces. The classes are organized by inheritance structure starting with java.lang.object. The interfaces do not typically inherit from java.lang.object.

The API report program also optionally generates a deprecated API page. The deprecated API page lists all of the APIs that have been deprecated. As is well known, deprecated APIs are those which have been marked or otherwise identified for impending or current removal from use. The need for deprecation comes about because, as a class evolves, its API changes. Methods are renamed for consistency, and new methods are added. Making such evolutionary changes introduces the problem that the old API must be maintained around a transition to the new API is effected; however, the old API should also be identified so as to avoid further propagation or use within developed code. The ability to mark a class or method as "deprecated" solves the problem, in that existing classes that use the old API continue to work, but the compiler can issue a warning when it finds references to deprecated items. Meanwhile, the API comments can be used to notify the programmer against using the deprecated item. A deprecated API is not recommended for use, generally due to improvements, and a replacement API is usually given as well.

It will be recognized that the aforementioned deprecated interface list or information can also be used in the context of the self-healing algorithm previously described. Specifically, in one variant, the use of deprecated APIs on the list is avoided in the self-healing algorithm, in effect precluding new (yet deprecated) APIs from being utilized during the healing process. Alternatively, code can be analyzed for deprecated APIs as described above, and then self-healed by replacing or otherwise compensating (e.g., stubbing) for the deprecated APIs. This approach is also useful for, e.g., maintaining legacy code. For example, the situation may exist where the entity or developer that wrote the code is no longer accessible for some reason, but an update to the code base is required due to changes in the underlying API. Hence, a code-based "search and replace" tool functionality is provided.

It will also be appreciated that most deprecated methods have alternate APIs that are called in their place. Accordingly, the foregoing approach is not limited to stubbing; one can in fact "heal" the code by re-organizing the code to call the new API.

Each serializable or externalizable class preferably has a description of its serialization fields and methods. This information is typically of interest primarily to re-implementers, not to developers using the API.

By providing this detailed information regarding the classes and their attributes, a programmer can more easily understand the resources available to him and how best to use those resources. By providing in such a highly organized reporting structure, a programmer can familiarize himself or herself with the API of this given library more rapidly.

Distributed Implementations—

Figure 4A:
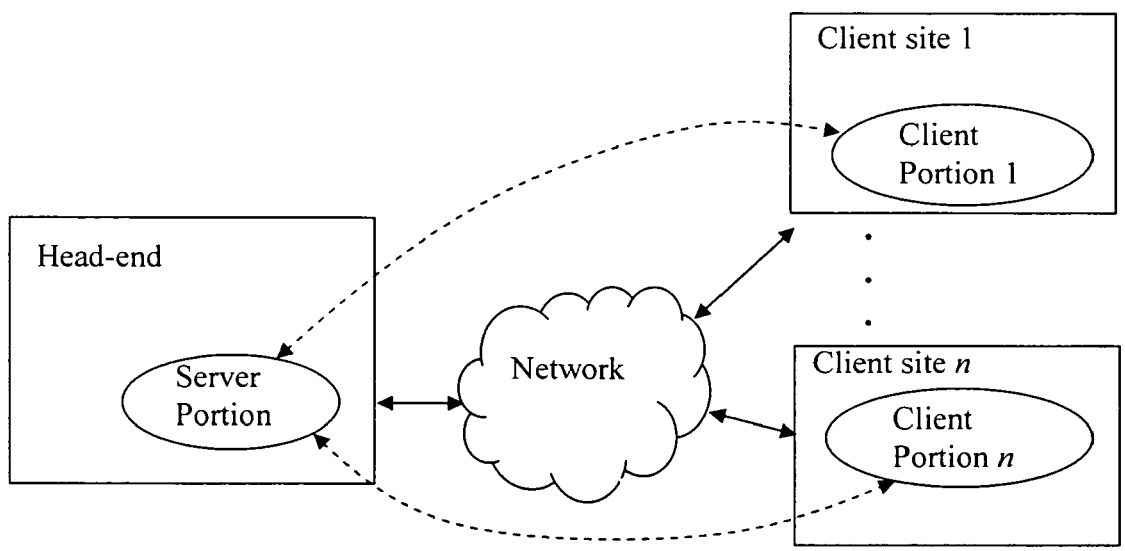
FIG. 4a is a graphical illustration of one exemplary embodiment of a distributed application (DA) software architecture implementing the software analysis and reporting functionality of the present invention.

It will also be appreciated that the interface analysis and reporting software of the present invention can be implemented in a distributed application (DA) fashion; e.g., such as where a server portion 402 is implemented at the head-end application server, and a client portion 404 is implemented at one or more third-party development sites or "customers" (see FIG. 4*a*). The third-party client portions communicate with the MSO-operated server portion, the latter which provides functional capabilities and security information (e.g., decryption keys, passwords, etc.) to enable the developers to access various assets associated with the server portion, such as by creation of a user-specific account where code under development or evaluation can be stored. Alternatively, the third-party client portions 404 of the DA can be used to submit (e.g., upload) code to the server portion in order to have the code analyzed, and a report generated for the developer regarding API usage/coverage, the compliance of their code with, e.g., OCAP requirements, etc. In this fashion, the operator of the server portion (e.g., an MSO or the like) can also act as a certification facility for third party applications. Such "certified" applications could then be passed into the MSO network for further distribution, development, provisioning, etc. This advantageously allows the MSO to certify applications entering its system, and similarly refuse distribution if OCAP or other required compliance is not met.

Moreover, usage of APIs can be certified as well, such by the MSO. For example, a source (e.g., the Onscreen Digital Navigator provided by the Assignee hereof) may provide a set of APIs that third-party applications can use to access MSO-specific network services and protocols. It is often desirable to pre-screen such applications to verify that they don't call restricted or otherwise prohibited APIs. This can also be controlled through indigenous Java Security mechanisms as well; however, in many cases, significant improvements in performance and memory footprint can be achieved by removing these "useless" or prohibited calls before an application is certified or admitted to the MSO network.

Figure 4B:
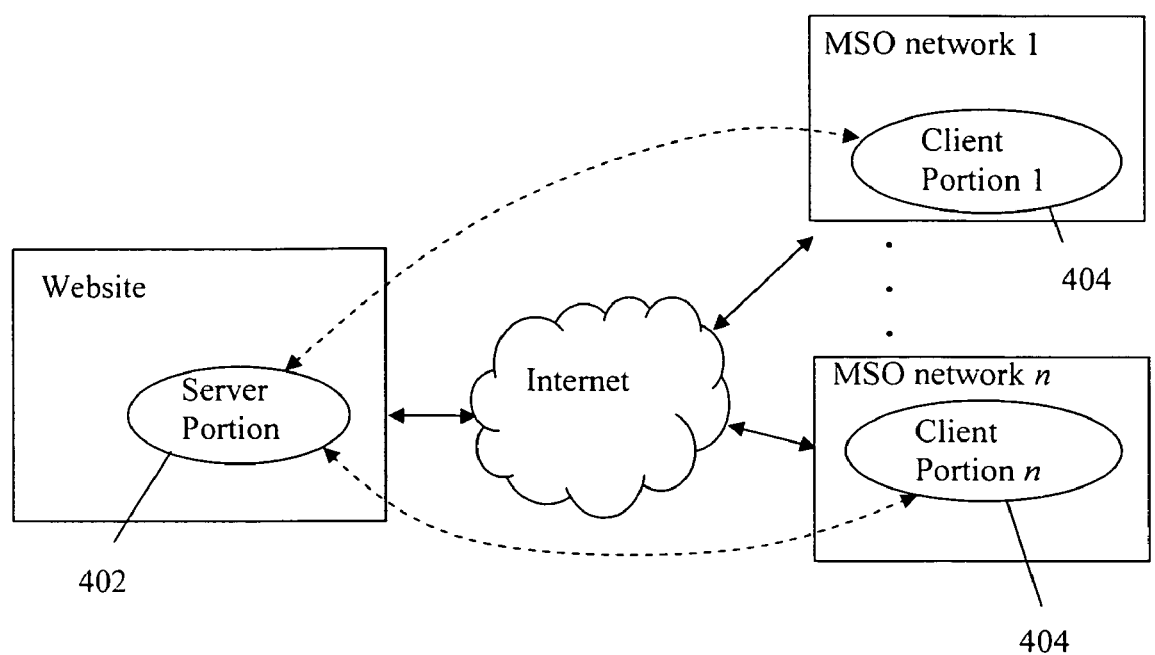
FIG. 4b is a graphical illustration of a second exemplary embodiment of a distributed application (DA) software architecture implementing the software analysis and reporting functionality of the present invention.

Conversely, as shown in FIG. 4b, a third-party website or server may comprise the server portion 402, which services one or more client portions 404 (associated, for example, with individual MSOs or network operators) in order to provide development and/or application validation or certification services. Validated or certified applications could optionally be affirmatively identified by the third-party, such as via a digital signature, one-way hash, symmetric or asymmetric encryption key, steganographic insertion, or other such approach that would substantially guarantee the authenticity or "pedigree" of the validation/certification and its integrity. For example, in one variant of the invention, the indigenous OCAP mechanisms for "signing" applications (based on SHA algorithms) is utilized.

It will also be appreciated that the aforementioned self-healing algorithm can in some cases affect the cryptographic hash, and hence either the hashing function can be turned off in such cases (e.g., OCAP includes an option to not perform signing), or alternatively the hash can be regenerated, such as by sending the "healed" application back to the certification entity (e.g., head-end) to generate a new hash based thereon. Other approaches to ensuring hash consistency after self-healing will also be recognized by those of ordinary skill provided the present disclosure.

Figure 4C:
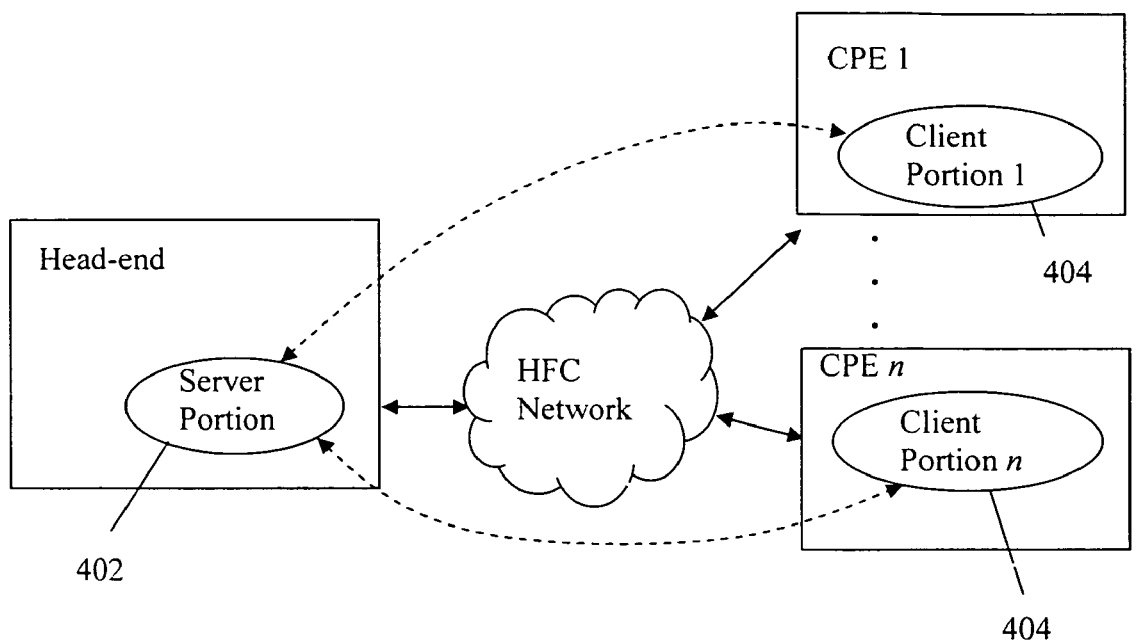
FIG. 4c is a graphical illustration of a third exemplary embodiment of a distributed application (DA) software architecture implementing the software analysis and reporting functionality of the present invention.

Moreover, a client-server or other distributed implementation can be used between a network entity (e.g., application server) and the CPE 106, as shown in FIG. 4c. The client portion 404 of the distributed application (DA) can employ the API bytecode analysis algorithm previously referenced herein to analyze applications either passed in to the CPE from the server portion 402 (or another entity), or resident on the CPE. This approach allows the CPE 106 to in effect profile its own applications with respect to API usage or coverage in situ, and pass this information to the server portion (or another designated entity). This is useful to, inter alia, develop an OCAP stack or middleware for substitution on an individual CPE with many different MSO and non-MSO applications (such as where the CPE 106 comprises a converged device potentially having software from several different origins.

Moreover, the self-healing algorithm described herein can be used to enable runtime forward compatibility, which provides benefits in terms of enhanced performance, user (customer) satisfaction, etc. by having applications that run seamlessly. For example, using self-healing, new applications running on old API set can be verified at runtime and "healed" to ensure proper operation. This process can also occur in the background, such as where the new application is evaluated and healed as required at time of download, CPE startup, low-use periods (e.g., late at night), etc. so as to not interfere with the user's perception or enjoyment of the viewing experience.

It will also be appreciated that the network operator, certifying entity, or even a developer may maintain a database of applications that have been analyzed, including any reports generated therefore according to the previously described method(s). The database can be organized or indexed according to any number of different parameters, such as e.g., an APP ID or other metric that uniquely identifies the application. Different versions of analyzed applications can also be maintained, and selectively introduced into the network (and CPE 106) such as via the methods described in co-pending and co-owned U.S. patent application Ser. No. 11/607,663 filed Dec. 1, 2006 and entitled "Methods And Apparatus For Software Provisioning Of A Network Device", which is incorporated herein by reference in its entirety. In this fashion, the network operator, etc. can quickly search the database for certified (e.g., OCAP-compliant) applications, whether for introduction into the network, or providing to a developer as a template or model for a new application being developed.

Dynamic analysis of the platforms deployed on the e.g., cable network can also be performed, with the relevant entity (e.g., head-end server process) automatically choosing a version appropriate to all or a subset of devices on the network. For example, the methods and apparatus of U.S. patent application Ser. No. 11/607,663 filed Dec. 1, 2006 and entitled "Methods And Apparatus For Software Provisioning Of A Network Device", previously incorporated herein, can be used for this purpose. Specifically, in one embodiment, the output of or selection made by the API analysis algorithm (and optionally the self-healing algorithm if required) can be used to populate and structure the VAF (version association file), the latter used by individual CPE in determining whether and how to update applications resident thereon.

Figure 4D:
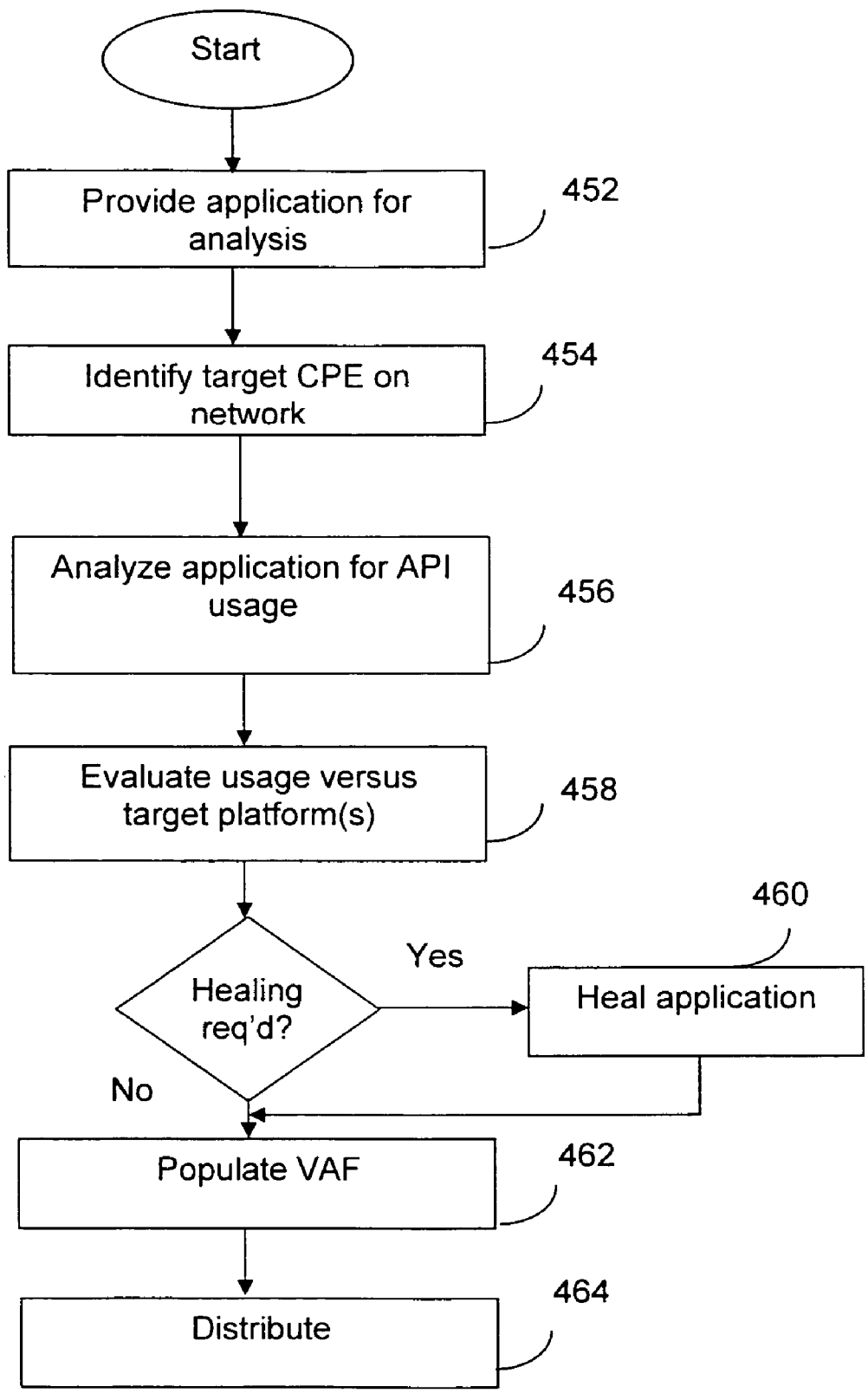
FIG. 4d is a logical flow diagram illustrating one exemplary embodiment of the method of evaluating applications and provisioning CPE within a content-based network according to the invention.

So, in a simple example (FIG. 4d), the API analysis algorithm of the present invention can be provided with (e.g., ingest) a new third-party application that is e.g., targeted for a specific functionality within the network (such as PVR or VOD navigation) per step 452, and determine the subset of CPE on the network to which the application ultimately will or may be delivered (step 454). This step 454 may be accomplished for example based on access or subscription level (e.g., only higher-end subscribers with VOD/PVR features will be targeted to receive the new application, since these are the only subscribers that would have use for it), or alternatively based on some other criterion (such as CPE hardware/software profile data held at the head-end or received dynamically from in situ CPE).

Next, per step 456, the new application is analyzed using the API analysis methods and algorithm previously described herein to identify API usage by the application. This is compared to the CPE capabilities (whether on a per-device basis or for a "nominal" CPE stack profile); e.g., the OCAP stack version running on the target CPE as previously described, per step 458. Where healing is required, the self-healing algorithm is employed (step 460) to eliminate useless APIs, and/or stub the code so as to operate properly within the target platform environment.

Per step 462, the verified and optionally "healed" application is then used to populate the VAF. This can be based on the information obtained per step 454 previously described, or based on yet other criteria. The new application is then distributed to the appropriate CPE per step 464, such as via a broadcast or multi-cast message to the relevant CPE indicating that an update or new download is available, thereby causing them to access the VAF and obtain the update/new application.

The foregoing approaches also support various business models, as described in greater detail subsequently herein.

Exemplary CPE—

Figure 5:
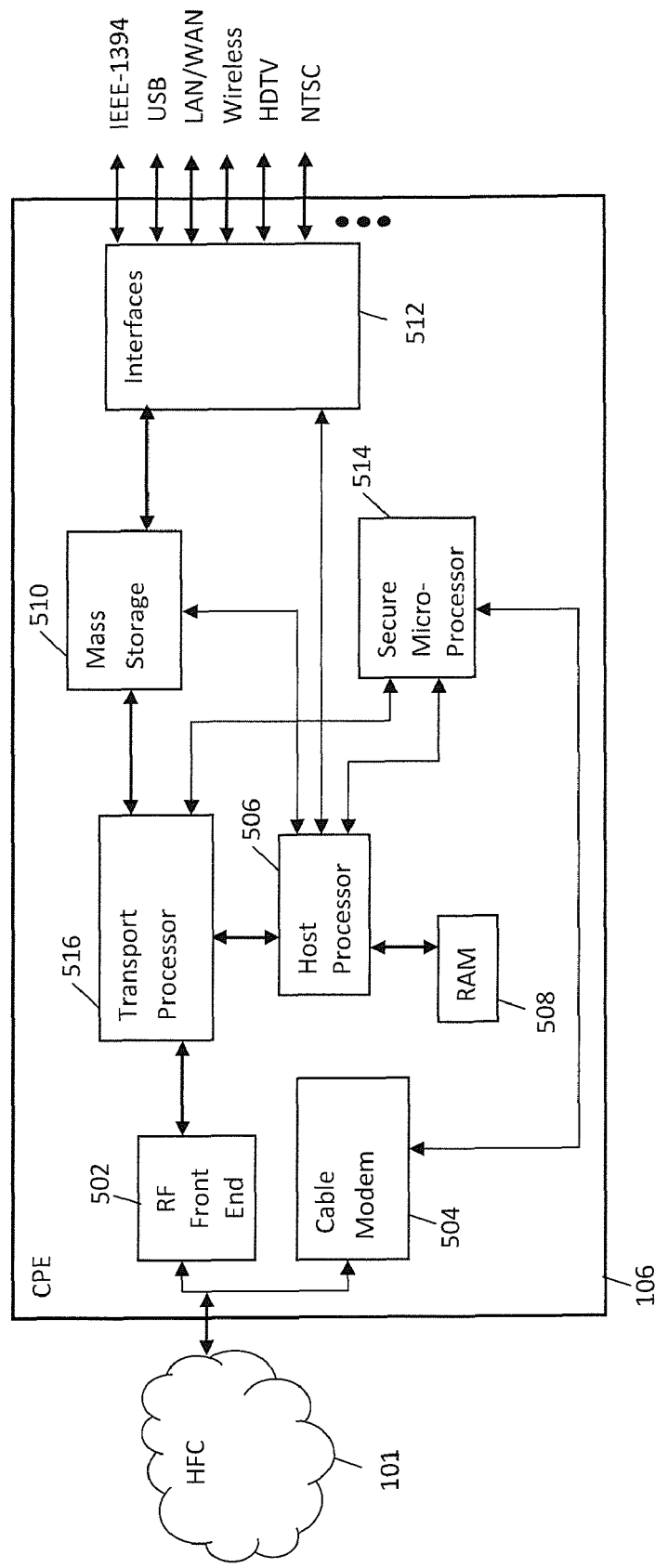
FIG. 5 is a functional block diagram of a consumer premises device (CPE) configured in accordance with one embodiment of the invention.

FIG. 5 illustrates a first exemplary embodiment of client premises equipment (CPE) 106 incorporating the software interface and reporting functionality of the present invention (e.g., in accordance with FIG. 4c discussed above).

As shown in FIG. 5, the CPE 106 comprises an OpenCable-compliant embedded system with integrated RF front end 502 (e.g., tuner stage, demodulator, etc.), cable modem (CM) 504, host digital processor (e.g., microprocessor) 506, RAM 508, mass-storage device 510, and a plurality of back-end network interfaces 512 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc., and for distribution of content or signals to one or more local domains or personal media devices (PMDs). The network interfaces 512 may also be configured to receive data or signals from connected devices within the host domain. While shown as an integrated device, it will be readily apparent that these components may be provided separately, and even exist in different locations.

The CPE 106 also optionally includes a recording device (e.g., DVD burner) 525 useful for recording the user's media, as well as (optionally playing it back after recording).

Other components which may be utilized within the device (deleted from FIG. 5 for simplicity) include FIFO or buffer memory (which may be implemented in RAM or otherwise), direct memory access (DMA) units, various processing layers (e.g., DOCSIS MAC or DAVIC OOB channel, MPEG, etc.) as well as media or network processors (NPs) and other specialized SoC or ASIC devices. These additional components and functionality are well known to those of ordinary skill in the cable and embedded system fields, and accordingly not described further herein.

The CPE 106 of FIG. 5 may further comprise a secure microprocessor (SM) 514 in data communication with a transport processor (TP) 516, each of the foregoing comprising an integrated circuit in the exemplary embodiment. It will be appreciated that while shown as separate devices, the SM, TP and host microprocessor 506 can be physically integrated into a common form factor or chip (e.g., SoC device) if desired.

The device 106 of FIG. 5 may also be provided with an OCAP-compliant monitor application and Java-based middleware which, inter alia, manages the operation of the device and applications running thereon. It will be recognized by those of ordinary skill that myriad different device and software architectures may be used consistent with the invention, the device of FIG. 5 being merely exemplary. For example, different middlewares (e.g., MHP, MHEG, or ACAP) may be used in place of the OCAP middleware of the illustrated embodiment.

The host processor 506 and internal bus and memory architecture of the CPE 106 of FIG. 5 are ideally adapted for high-speed data processing, at least sufficient to support the client-side processing tasks necessary to implement software interface analysis and reporting functions of the present invention effectively and without significant latency, when such algorithm is disposed on the CPE 106. This may be accomplished, e.g., through a single high-speed multifunction digital processor, an array of smaller (e.g., RISC) cores, dedicated processors (such as a dedicated MPEG media processor and interface controller), etc.

As part of the application layer of the CPE 106, various different types of client applications may be running (or operable to run) consistent with the present invention. These applications can be analyzed by the resident software interface analysis and reporting software, itself rendered as an application running on the CPE in one embodiment.

The present invention also contemplates the use of the interface analysis and reporting software on a PC or other such device in the user's premises that is in data communication with the CPE 106. In this capacity, the user could conduct on-premises application development, evaluation, certification, and upload onto the CPE 106. Similarly, the analysis and reporting software can be run on the CPE 106 in a MSO-controlled fashion, such that the MSO can locally evaluate, certify, and permit addition of new applications to the local CPE 106. In this fashion, the MSO maintains quality standards and control over what is loaded onto the CPE.

The CPE middleware and any other relevant components may also be modified in order to provide a "universal" software interface, such that application developers can write their applications to make use of the API usage and coverage capabilities of the analysis algorithm. Similarly, the "universal" CPE described in co-pending and co-owned U.S. patent application Ser. No. 10/782,680 filed Feb. 18, 2004 and entitled "Media Extension Apparatus And Methods For Use In An Information Network", incorporated herein by reference in its entirety, may be used consistent with the present invention in order to allow specific features and extensions (e.g., Java or JMF extensions) to be configured by a particular MSO or other entity when the CPE is used in their network.

Various indications are optionally utilized within the hardware environment of the CPE 106, including e.g., an LED or other indicator to show cable modem link and activity, power status, LAN—802.3 activity on one or more Ethernet ports (if installed), etc. Furthermore, a "soft" display (e.g., TFT or LCD display having software generated indications) may be used on the CPE 106 (or a remote device in communication therewith) to provide a flexible display environment. The methods and apparatus of co-owned and co-pending U.S. patent application Ser. No. 10/773,664 filed Feb. 6, 2004 entitled "Methods And Apparatus For Display Element Management In An Information Network", incorporated herein by reference in its entirety, may be used within the CPE 106 or other communicating devices. Specifically, display elements such as GUI windows or discrete indicators in a client device running multiple related or unrelated applications can be managed and controlled. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent.

The CPE 106 mass storage device 510 of the illustrated embodiment comprises a Serial-ATA (SATA) or Ultra-ATA (also known as Ultra-DMA, or ATA-4/5/6/7) hard disk drive for the operating system and content storage of at least 300

GB, although higher or lower capacities and even RAID arrays may be used for this purpose. The CPE is also optionally configured allow for an external USB (e.g., USB 2.0) drive to be attached and automatically added to the existing storage. It will also be appreciated that USB keys of the type well known in the art can be used consistent with the USB port(s) of the CPE 106, so as to make the data storage device highly mobile and of very small size.

The RF front end 502 of the CPE may comprise a traditional video RF front end (e.g., tuner) adapted to receive video signals over, e.g., a QAM. For example, one exemplary embodiment of the RF front end 502 comprises one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs. Additionally, the RF front end 502 modulates, encrypts/multiplexes as required, and transmits digital information for receipt by upstream entities such as the CMTS or a network server.

It will also be recognized that the present invention may be used in conjunction with a number of different capabilities and features useful with traditional CPE functions. For example, the error logging and reporting methods and apparatus described in co-owned and co-pending U.S. patent application Ser. No. 10/722,206 entitled "Methods and Apparatus for Event Logging in an Information Network" filed Nov. 24, 2003, which is incorporated herein by reference in its entirety, may be used within the CPE of FIG. 5. For example, the aforementioned disclosure describes methods and apparatus (including APIs) for logging errors that occur on client devices or CPE 106. In the present context, these errors may include errors generated within or by the software analysis and reporting algorithm, or applications being analyzed thereby, which can then be transmitted upstream to a responsible entity (e.g., head-end management node or server, etc.) for further analysis or correction. Also, the error logging APIs can be included within the scope of the API analysis performed by the software.

Similarly, the hardware registry apparatus and methods described in co-owned and co-pending U.S. patent application Ser. No. 10/723,959 entitled "Methods and Apparatus for Hardware Registration in a Network Device" filed Nov. 24, 2003, also incorporated herein by reference in its entirety may be used consistent with the present invention. This disclosure provides apparatus and methods for control of hardware within a networked electronic device (e.g., CPE) through use of a hardware registry. The registry contains records that correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In one exemplary configuration, the CPE 106 is adapted to provide control over Host CORE optional circuitry for a digital video recorder (DVR) and digital video interface (DVI). A DVR/DVI application can therefore be downloaded to retail or leased set-top boxes and other consumer electronics equipment, which provides control of any available DVR/DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s). The CPE 106 described herein may either be of third-party or leased origin, and hence may benefit under either model when used in conjunction with the foregoing hardware registry approach.

Additionally, the self-healing capability previously described can be used in this context. For example, application developers can write their applications assuming that the appropriate APIs are in place irrespective of actual hardware capability. This approach has the benefit of not bogging down the network with a multiplicity of versions of the same code, or otherwise inflating a single application with multiple case scenarios to try to accommodate hardware discrepancies.

The software interface management apparatus and methods described in co-owned and co-pending U.S. patent application Ser. No. 10/883,374 filed Jun. 30, 2004 and entitled "Apparatus And Methods For Implementation Of Network Software Interfaces", also incorporated herein by reference in its entirety, can be used within the CPE 106 or associated devices. Specifically, in one embodiment, network-specific programming interfaces (e.g., APIs) may be downloaded to the CPE, registered, authenticated, stored and executed in a software protocol stack implementing OpenCable Application Platform (OCAP) or Multimedia Home Platform (MHP) standards. The host device software comprises a "manager" module that registers APIs identified by the OCAP Monitor Application, such that all applications launched thereafter on the device can use these communications APIs, provided they have the appropriate permission(s). This relieves individual applications from having to support details regarding network-specific protocols and APIs. In an alternate embodiment, class and data files associated with the API functionality are downloaded along with an application. The downloaded application registers the API using a modified version of the API using a description file (DF). The DF describes the class and data files provided with the application that are part of the registered API. The registration with the monitor may also be used as an entry point or basis for analysis via the software interface analysis and reporting software described herein. For example, the self-healing approach previously described herein can be used in the case where the CPE tries to run a newer version application with old versions of the communication APIs. Updated APIs can then be retrieved, or pulled from a database of stubbed APIs if so desired.

As previously noted, the client device (e.g., CPE 106) may take any number of forms, including for example a converged device or "hive" such as that described in co-pending U.S. patent application Ser. No. 11/378,129 filed Mar. 16, 2006 previously incorporated herein. This converged device comprises a remotely manageable premises device that, inter alia, acts as a centralized client networking platform providing gateway services such as network management as well as traditional content and high-speed data delivery functions. The converged device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or WiFi architectures may also be provided via the device; these services can make use of the network operator's indigenous VoIP or comparable telephony capability if desired, thereby providing an even more unified service environment.

The converged premises device can also provide a trusted domain (TD) for content or data, as well as allowing a subscriber total mobility in the home by not limiting content or data to any one viewing/access location. For example, content or data may be accessed on any monitor in the premises, as well as on a PC or personal media device (PMD). Exemplary trusted domain configurations useful with the present invention are described in co-pending U.S. patent application Ser. No. 11/006,404 filed Dec. 7, 2004 and entitled "Technique For Securely Communicating And Storing Programming Material In A Trusted Domain", U.S. patent application Ser. No. 11/006,404 filed Dec. 7, 2004 and entitled "Technique For Securely Communicating Programming Content", and U.S. patent application Ser. No. 11/584,208 filed Oct. 20, 2006 and entitled "Downloadable Security And Protection Methods And Apparatus", each of the foregoing incorporated herein by reference in its entirety.

The software disposed on the exemplary CPE 106 is typically byte-compiled Java code. This is software written in Java that is compiled into Java byte code (object code) that can be run on a standard Java virtual machine (JVM). While the use of Java is preferred because of the universality and other benefits that it provides, the use of other programming languages is consistent with the use of the present invention.

A Java virtual machine (JVM) is also preferably implemented using software that runs on the microprocessor 506. Note that the Java virtual machine may be coded in a programming language that is different that used to create the Java byte code itself. The byte-compiled Java code can be used to control and configure the various components of the media server or other CPE equipment including displaying various options to the user and receiving input from the user.

Business Models—

In another aspect of the invention, a number of different business models and methods are disclosed. As previously noted, the interface analysis and reporting software of the present invention can be implemented in a stand-alone fashion, such as where a PC or other such device runs the software to analyze other files on that PC (or a networked device).

The interface analysis and reporting software can also be implemented in a distributed application (DA) fashion; e.g., such as where a server portion 402 is implemented at the head-end application server, and a client portion 404 is implemented at one or more third-party development sites or "customers" (see FIG. 4a). User-specific accounts can be created within or associated with the MSO server portion, so that multiple third-party developers can be supported simultaneously. The third-party client portions 404 of the DA can be used to submit (e.g., upload) code in order to have the code analyzed, and a report generated for the developer regarding API usage/coverage, the compliance of their code with, e.g., OCAP requirements, etc. This may be on a for-profit basis or otherwise (e.g., "open" model). In this fashion, the MSO can act as a certification facility for third party applications. Whether such applications are intended to be used in its network or otherwise. Such "certified" applications may then be passed into the MSO network for further distribution, development, provisioning, etc., or returned to the developer.

Moreover, the MSO can generate or offer information, such as software specifications, to third-party developers to permit them to develop applications meeting the MSO network requirements (e.g., OCAP compliance, etc.). This information may even take the form of an SDK (software development kit) or the like which can enable developers to rapidly prototype, debug, and certify applications for use in the MSO network, such as on a particular CPE.

Conversely (as shown in FIG. 4b), a third-party website or server may service one or more client portions associated for example with individual MSOs or network operators in order to provide development and/or application validation or certification services. As above, this approach can be a for-profit service, or otherwise. Industry-based organizations that are agnostic to the MSO (e.g., CableLabs) may also act as the operator of such website, thereby providing MSO's with a familiar and known quantity for application certification.

Also, as previously noted, a client-server or other distributed implementation can be used between a network entity (e.g., application server) and the CPE 106, as shown in FIG. 4c. The client portion 404 of the distributed application (DA) can employ the API bytecode analysis and reporting algorithm to analyze applications either passed in to the CPE from the server portion 402 (or another entity), or resident on the CPE. This approach allows the CPE 106 to profile its own applications with respect to API usage or coverage in situ, and pass this information to the server portion (or another designated entity). The CPE vendor or manufacturer might for example include the API analysis and reporting software within the applications or middleware stack of the CPE at time of manufacture, thereby enabling them (or the MSO) to communicate with the installed device and remotely analyze any applications running on the device (or analyze or test applications installed at time of manufacture).

In another aspect, the methods and apparatus of the present invention can be used to simplify maintenance and support of applications on a non-homogenous collection of CPE 106 running different versions of an API. Such may be the case, for example, where the CPE are bought and sold at a commercial retailer, and no longer leased or provided by the MSO. The MSO must ensure that their applications run on every device in the network when they can no longer control the versioning of all the APIs on the network. The self-healing ability and analysis capabilities described herein can therefore be used by the MSO or another entity to help ensure that their applications run well on, e.g., all of a plurality of heterogeneous platforms within the network.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of programmatically analyzing byte code on an analysis apparatus in order to identify one or more called application programming interfaces (APIs), said analysis apparatus comprising processing logic and a storage device, said method comprising:
- providing, on said storage device, a first file path containing first byte code;
- providing a second file path containing second byte code;
- parsing, logic, files found on said first file path to create at least one first parsed class file;
- placing a name of at least one class defined in said at least one first parsed class file into a dictionary;
- parsing files found on said second file path to create at least one parsed second class file;
- evaluating each class on said second file path to identify one or more methods associated therewith;
- evaluating, via said processing logic, each of said one or more methods to identify at least one method or field invocation associated with any classes in said dictionary;
- if said evaluation of each of said one or more methods identifies at least one method or field invocation associated with a class missing from said dictionary, matching said identified at least one method or field invocation associated with a class missing from said dictionary with a similar class present in said dictionary; and
- rendering said first byte code interoperable with said second byte code by creating an association between said at least one method or field invocation associated with a class missing from said dictionary and said similar class.

2. The method of claim 1, further comprising adding a name of each of said evaluated classes in said dictionary associated with said at least one method or field invocation to a report.

3. The method of claim 2, wherein said act of adding further comprises adding specific method and instruction information to said report.

4. The method of claim 2, wherein said act of adding further comprises adding debugging information to said report.

5. The method of claim 1, further comprising identifying at least one class of said first file path in said dictionary that has said at least one invoked method or field.

6. The method of claim 1, wherein at least one of said first or second byte code comprises an application adapted to run on an Open Cable (OCAP) compliant consumer premises device (CPE).

7. A method of analyzing class-based computer code using a reference code apparatus corn rising at least one interface and a data processor in operative communication with said at least one interface, said method comprising:
- receiving a first input containing first code;
- receiving, at said at least one interface, a second input containing second code;
- extracting a first set of classes from said first input;
- extracting, using said data processor, a second set of classes from said second input;
- analyzing each class in said first set of classes to generate a dictionary;
- analyzing each class in said second set of classes to generate a set of methods;
- analyzing each method from said set of methods to identify invocations of classes present in said dictionary;
- based at least in part on said analysis of each method, generating, using said data processor, a listing of invocations of classes not present in said dictionary; and
- utilizing said listing of classes to create one or more place holder methods;

wherein at least one of said one or more place holder methods comprises a declarative method configured to identify itself and one or more parameters said declarative method accepts.

8. The method of claim 7, further comprising adding said invoked classes to a report.

9. The method of claim 8, wherein said report lists all application classes within said first set of classes, all application classes in said second set of classes, and all classes and methods in said second set of classes that identify one or more of said first set of classes.

10. The method of claim 8, wherein said report further comprises:
- a first section listing library calls in said first set of classes and said second set of classes; and
- a second section listing at least a location of at least one call to a given application programming interface (API).

11. The method of claim 10, wherein said report further comprises a listing of all classes identified during said acts of extracting of said first input and said second input.

12. The method of claim 11, wherein said report further comprises a separate page for each of (i) classes, (ii) interface, (iii) nested classes; and (iv) nested interfaces.

13. The method of claim 8, wherein said act of adding comprises rendering at least a portion of said report in a markup language format.

14. A non-transitory computer-readable apparatus configured to store a computer program thereon, said computer program configured to analyze class-based computer code, said computer program comprising a plurality of instructions, configured to, when executed:
- extract a first set of classes from a first input, said first input comprising first code;
- extract a second set of classes from a second input, said second input comprising second code;
- analyze each class in said first set of classes to generate a listing;
- analyze each class in said second set of classes to generate a set of methods;
- analyze each method from said set of methods to identify invocations of classes present in said listing;
- based at least in part on said analysis of each method, identify a chain comprising one or more deadlocking methods configured to reference at least one method configured to execute prior to said one or more deadlocking methods in said chain; and
- generate a report configured to list said chain.

15. The apparatus of claim 14, wherein:
- said first code comprises a first set of files associated with a first application, said first application comprising a known set of application programming interface (API) calls; and
- said second code comprises a second set of files associated with a second application, said second application being passed to said computer program from a processing entity for evaluation at said computer program.

16. The apparatus of claim 15, wherein:
- said processing entity further passes to said computer program a catalog of APIs available to said processing entity; and
- said plurality of instructions are further configured to, when executed:
  - compare said catalog with said identified invocations;
  - based on said comparison, identify at least one omission or discrepancy between said catalog and said identified invocations; and instruct said processing entity to request at least one library to correct said at least one omission or discrepancy.

17. The apparatus of claim 15, wherein said first and second sets of files comprise byte code.

18. A method of analyzing class-based computer code to identify one or more aspects of application programming interface (API) called within an application utilizing a library for use with a code processing device comprising a computer-readable medium and processing logic, said method comprising:
    identifying, on said computer-readable medium, first and second sets of code to be processed;
    generating a first dictionary of all public classes and interfaces in said library;
    analyzing, via said processing logic, a first set of classes and interfaces from said first set of code to generate a listing;
    analyzing a second set of classes and interfaces from said second set of code to generate a set of methods;
    comparing said listing and said set of methods to generate a second dictionary, said second dictionary comprising a plurality of entries indicating a plurality of APIs called by said application; and
    based at least in part on said comparison, identifying, via said processing logic, one or more of said plurality of APIs configured to rely on a circular reference;
    wherein said circular reference comprises a call into an individual one of said one or more of said plurality of APIs through a reference from said individual one of said one or more of said plurality of APIs.

19. The method of claim 18, wherein:
    said second set of code is associated with said application; and
    said first set of code is associated with a computer program with known API calls.

20. The method of claim 19, wherein said method further comprises:
    comparing said first and second dictionaries; and
    based at least on said act of comparing, determining if said library comprises one or more APIs called by said application.

21. The method of claim 20, wherein said method further comprises:
    based at least in part on said act comparing, identifying at least one API called by said application, said at least one API not included in said library; and
    based at least in part on said act of identifying said at least one API not included in said library, requesting a second library from a storage device.

22. The method of claim 18, wherein said application is enabled to run on a network device in communication with a hybrid fiber network.

23. A system able to identify application programming interfaces (APIs) called by a first application used in content delivery network, said system comprising:
    a memory;
    a first processing entity disposed on a first computer; and
    a second processing entity disposed on a second computer and in data communication with said first computer, said second processing entity configured to run a computer program thereon, said computer program comprising a plurality of instructions configured to, when executed:
        receive said first application to be evaluated from said first processing entity;
        extract a set of classes from code associated with said first application;
        analyze said set of classes to generate a set of methods;
        compare said set of methods with a listing derived from one or more second applications present in a current configuration of a consumer premises equipment (CPE);
        based on said comparison, identify at least one API called by said first application; and
        when all APIs called by said first application are present in said listing, confirm said first application for distribution.

24. The system of claim 23, wherein said one or more second application comprise at least one reference program having a known API usage.

25. The system of claim 24, wherein said first application has associated source code, said associated source code being unavailable to said second processing entity.

26. The system of claim 23, wherein said first computer is operated by a software developer, and said second computer is operated by a cable network operator.

27. The system of claim 23, wherein said first computer is operated by a managed network operator, and said second computer is operated by an industry standards or certification facility.

28. The system of claim 23, wherein:
    said second computer comprises a consumer premises equipment (CPE), and
    said content delivery network comprises a managed content network.

* * * * *